US012346411B1

(12) United States Patent
Ganjam et al.

(10) Patent No.: US 12,346,411 B1
(45) Date of Patent: Jul. 1, 2025

(54) AUTOMATED SURFACING OF MULTI-DIMENSIONAL INSIGHTS

(71) Applicant: Conviva Inc., Foster City, CA (US)

(72) Inventors: Aditya Ravikumar Ganjam, Foster City, CA (US); Yan Li, Foster City, CA (US); Jose Caldeira Jesus, London (GB)

(73) Assignee: Conviva Inc., Foster City, CA (US)

( * ) Notice: Subject to any disclaimer, the term of this patent is extended or adjusted under 35 U.S.C. 154(b) by 0 days.

(21) Appl. No.: 18/642,480

(22) Filed: Apr. 22, 2024

(51) Int. Cl.
  *G06F 18/2433* (2023.01)
  *G06F 17/18* (2006.01)
  *H04N 21/24* (2011.01)

(52) U.S. Cl.
  CPC .......... *G06F 18/2433* (2023.01); *G06F 17/18* (2013.01); *H04N 21/24* (2013.01)

(58) Field of Classification Search
  CPC ..... G06F 18/2433; G06F 17/18; H04N 21/24; H04N 1/00413; H04N 1/00411
  USPC ....................................................... 702/181
  See application file for complete search history.

(56) References Cited

U.S. PATENT DOCUMENTS

| | | | |
|---|---|---|---|
| 2008/0172348 A1* | 7/2008 | Tien | G06Q 30/0202 706/15 |
| 2013/0111321 A1* | 5/2013 | Dorrell | G06F 40/177 715/215 |
| 2018/0089444 A1* | 3/2018 | Kenthapadi | G06F 21/6254 |
| 2020/0019911 A1* | 1/2020 | Powers | G06F 16/24578 |
| 2020/0211700 A1* | 7/2020 | Zasowski | G16H 10/60 |
| 2021/0037031 A1* | 2/2021 | Kulkarni | G06F 17/18 |
| 2022/0334709 A1* | 10/2022 | Li | G06F 3/04855 |

* cited by examiner

*Primary Examiner* — Michael P Nghiem
(74) *Attorney, Agent, or Firm* — Van Pelt, Yi & James LLP

(57) ABSTRACT

Evaluating multi-dimensional information includes providing a plurality of initial dimensions. Each dimension represents a factor related to performance. It further includes receiving a first selection of a value for a first dimension in the plurality of initial dimensions. It further includes providing a plurality of potentially significant dimensions from among a set of dimensions. It further includes receiving a second selection of a second dimension from among the plurality of potentially significant dimensions. It further includes determining the plurality of potentially significant dimensions based on an indication of presence of outliers in the potentially significant dimension. A dimension that significantly affects performance is identified.

10 Claims, 11 Drawing Sheets

AUTOMATED SURFACING OF MULTI-DIMENSIONAL INSIGHTS

BACKGROUND OF THE INVENTION

Delivery of content such as streaming videos involves many entities and many distribution paths. Any entity along any of the content distribution paths may fail silently, at any time, directly causing degradation of the viewing experience. As such, when an issue occurs, determining relevant information to determine actions can be challenging. Improved techniques for identifying actions to address issues in streaming are needed.

BRIEF SUMMARY OF THE INVENTION

Automated surfacing of multi-dimensional insights is disclosed. In some cases, a plurality of initial dimensions is provided. In some cases, a first selection of a value for at least one of the initial dimensions is received. In some cases, a plurality of potentially significant dimensions is provided. In some cases, the plurality of potentially significant dimensions is determined based on an indication of presence of outliers in the plurality of potentially significant dimensions. In some cases, a second selection of a second dimension from among the plurality of potentially significant dimensions is received.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The following are embodiments of automated surfacing of insights and analytics from multi-dimensional information. Embodiments of the techniques described herein assist users in diagnosing issues determined from multi-dimensional event data. As one example, the techniques described herein may be utilized to diagnose streaming video issues and problems. Embodiments of the techniques described herein assist users in reducing the time to resolution of video streaming issues, as well as reduce the time to identifying an action to resolve the video streaming issues. As one example, embodiments of the techniques described herein provide intelligence in the streaming issue diagnosis and resolution workflow.

Figure 1:
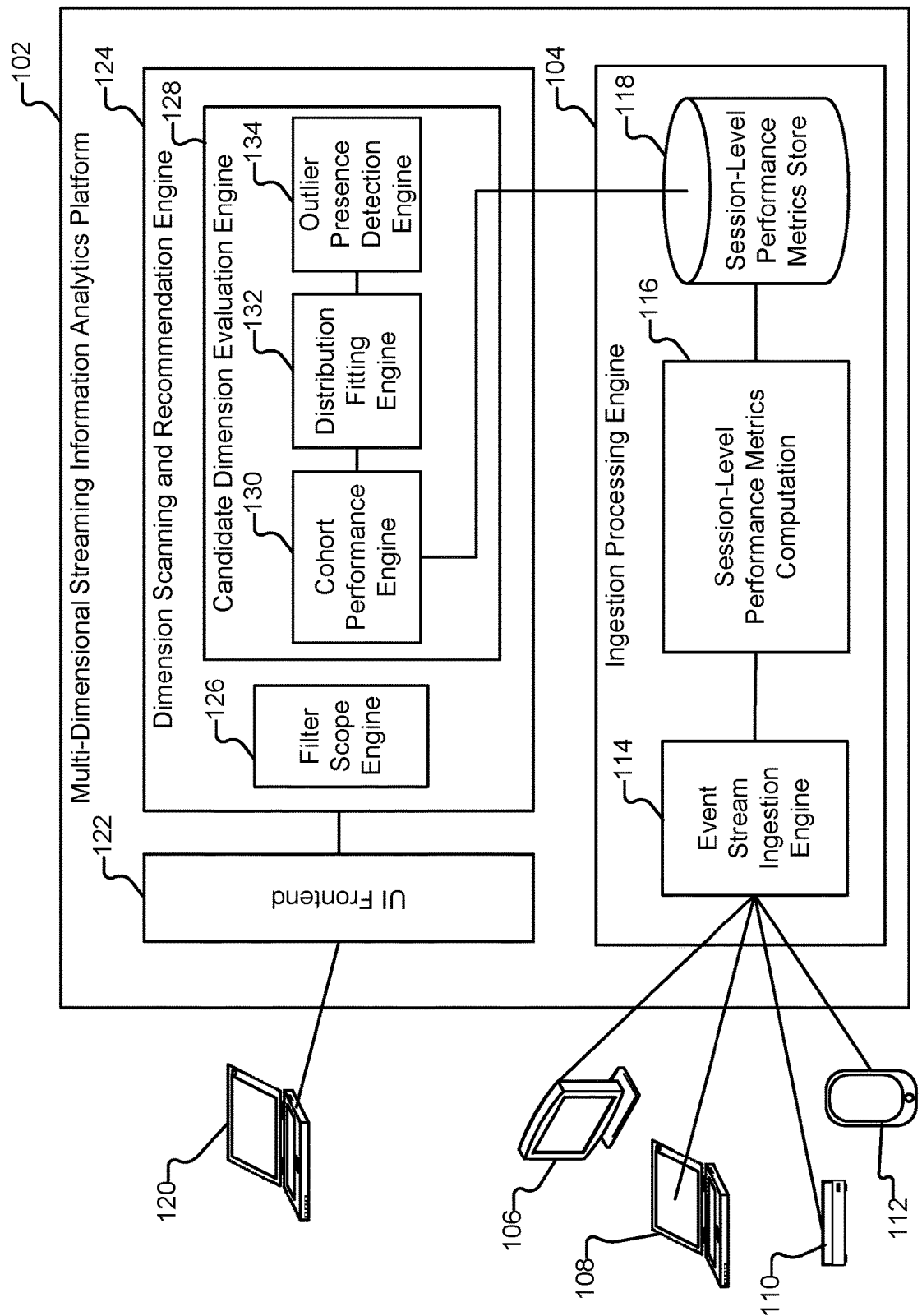
FIG. 1 illustrates an embodiment of a system for analysis of multi-dimensional information.

FIG. 1 illustrates an embodiment of a system for analysis of multi-dimensional information. In some embodiments, platform 102 is configured to facilitate evaluation and analysis of multi-dimensional information collected by the platform. While examples of evaluating and scanning multi-dimensional information in the context of video streaming are described herein for illustrative purposes, the techniques described herein may be variously adapted to accommodate analysis of multi-dimensional information and event data collected in any other contexts, as appropriate.

In this example, ingestion processing engine 104 is configured to ingest and process streams of event data from various client devices. For example, client devices 106, 108, 110, and 112 are examples of remote client devices (e.g., desktops, laptops, mobile devices, set-top boxes, etc.) that have installed content players that are used to play or stream video content (e.g., live and/or on-demand content). In some embodiments, to play content, a content player of a client device makes a request to a CDN (content delivery network) server through various Internet Service Providers (ISPs). For example, a request is made to a content management system (CMS). If available, the requested content is fetched from edge servers of the content delivery networks, which act as a form of cache layer for the content. If the requested content item is not available at an edge server, the content may be pulled from origin servers, which can include encoded versions of raw content. The origin servers may be owned by a publisher of the content that provides raw content and encodes the data (e.g., using an encoder).

In some embodiments, each client device has installed a sensor that continuously monitors the quality of the viewing experience for video playback sessions, where the sensor then periodically sends back measurements to multi-dimensional streaming information analytics platform 102 (e.g., over a network such as the Internet). As one example, the sensor is implemented as a software development kit (SDK) library running on the client device. As one example, the quality of experience (QoE) measurements are sent periodically in the form of heartbeats. In some embodiments, the QoE measurements in the heartbeat messages include raw event data (e.g., sensor measurement samples taken at points in time) that is sent over time to the platform, forming a stream of raw event data that is ingested by event stream ingestion engine 114. In some embodiments, event stream ingestion engine 114 is implemented as a hypertext transfer protocol (HTTP) gateway server, where heartbeat messages are placed on a queue such as a Kafka queue. In addition to collecting event streams from client devices that have content players, streams of raw event data are also collected from other sources or endpoints such as origin servers, CDN edge servers, etc. (e.g., in the form of logs).

In various embodiments, a heartbeat message includes a viewer identifier (of the viewer of content), client identifier (of the client device from which the raw event data is being collected), as well as a session identifier (of the video streaming session for which the measurements are taken). In some embodiments, and as will be described in further detail below, the raw event data that is ingested is used to generate client or session-level or individual-level performance metrics.

In this example, session-level performance metrics computation engine 116 is configured to determine, from the ingested raw event data pertaining to a session, session-level performance metrics, such as rebuffering ratio, video startup failure, exit before video start, etc. As one example, queued heartbeats are passed to a real-time computation stack that is configured to summarize incoming raw event data on a per-video session basis (e.g., generate summarized session-level performance metric values per session—as identified by a session identifier in a heartbeat). In some embodiments, a second stack is used for handling historical information (e.g., previously captured session information).

As one example, a heartbeat may contain measurements of buffering time and playing time sampled at various points. The collection of buffering time and playing time measurements in the raw event stream pertaining to an individual session may be aggregated and used to determine a session-level performance metric. In the following examples, a composite metric, referred to herein as a streaming performance index (SPI), is generated for each session. As one example, SPI is a composite metric or score that is composed based on other metrics, such as rebuffering ratio, bitrate, video startup failure, exit before video start, start time, etc. While examples involving SPI are described herein for illustrative purposes, the analytics described herein can be used to diagnose streaming issues determined relative to multiple metrics or combinations of metrics.

In this example, the session-level SPI metric values are stored to session-level performance metrics store 118. As one example, session-level performance metrics store 118 is implemented using a high-performance data store.

In some embodiments, the session-level metrics are tagged with metadata such as associated viewer, client, and session identifiers. In some embodiments, session-level metrics are also tagged or characterized with multi-dimensional metadata corresponding to a variety of dimensions, where each dimension may have numerous dimension values. One example of such a dimension is a device name dimension, where each possible value of the device name dimension is a string corresponding to a different device name that is reported by a client device. Another example of a dimension is a geographic region dimension, where the different available values under the geographic region dimension are different countries. Yet another example of a dimension is an ISP dimension, where the different values of the ISP dimension are different ISPs (e.g., different ISP dimension values such as Comcast, AT&T, Verizon, etc.). Other examples of dimensions include content type (with dimension values such as live or Video-on-Demand), CDN (with dimension values such as Akamai, Level3, etc.), etc.

In some embodiments, multi-dimensional streaming information analytics platform 102 is configured to monitor the performance of streaming sessions by evaluating information such as the session-level performance metrics. For example, platform 102 monitors the quality of viewing experience of video sessions by monitoring the aforementioned metrics (e.g., SPI, rebuffering, etc.).

In some embodiments, an analyst user, such as a user of device 120, can access the platform via user interface (UI) frontend 122 to view information pertaining to session traffic. Various entities may utilize the services of the streaming analytics platform. For example, ISPs, CDNs, publishers, etc. may be customers that consume the services provided by the streaming analytics platform.

As one example, platform 102 evaluates the session-level performance metrics in metrics store 118 to provide analytics via a dashboard interface that is provided via UI frontend 122. Via the dashboard interfaces provided by via the UI frontend, the user can view, for example, an overview of the performance of streaming sessions, as well as perform analysis to identify or investigate the cause of any performance issues that occur. Examples of interfaces for viewing and diagnosing streaming performance issues are described in further detail below.

In the context of video streaming, performance issues may arise, in which the quality of the viewing experience is degraded (e.g., due to large amounts of buffering, video start up failures, etc.). In some embodiments, platform 102 is configured to identify and surface anomalous performance behavior based on monitoring of performance metric values for streaming session traffic. In the example of the SPI metric, anomalous performance behavior includes behavior in which the SPI metric for sessions is low.

It would be beneficial if the source of such issues could be identified quickly so that remedial actions can be performed to improve the quality of experience. For example, it would be helpful if an issue could be localized to a specific type of device running a specific version of the software, or if it could be determined that the issue is really due to streaming from a specific CDN when using a certain ISP, rather than being specific to any particular type of device. One challenge that hinders such investigation is the large diversity of clients that stream video content, as well as the presence of multiple entities in the content delivery pipeline.

For example, as described above, viewing sessions may be characterized according to multiple, numerous dimensions, where each dimension may have many possible values. As one example, under the device type dimension, there may be hundreds of different values for device type. For a single device type, clients may be running multiple different versions of an operating system. Further, client devices may be connected to the Internet through various different ISPs, which again, there may be hundreds of. Client devices may also be obtaining content from various different CDNs. Thus, searching through the performance data from these disparate clients, which can be characterized by hundreds of different dimensions, each with hundreds of different possible dimension values, to isolate the root of an issue to a specific group of clients that have some shared combination of characteristics (e.g., dimensions and dimension values) can be challenging.

As one example, suppose that a content publisher is a subscriber of the services provided by platform 102. Suppose that the analyst user is associated with the publisher. Suppose that the streaming sessions involving the content publisher are tagged with a hundred dimensions. Examples of dimensions include device name, city, ISP, etc. The automated insights system 102 is configured to determine, of those 100 dimensions, which few dimensions have insights that would help an analytics user to drill down on a particular performance problem, as represented in this example by a low SPI value. That is, the system has shown that there is an aggregate, low SPI for sessions associated with the publisher. The analytics user would like to know why the SPI value is low. Using embodiments of the techniques described herein, platform 102 is configured to determine, among the 100 dimensions, which of the dimensions would be useful for further evaluation to provide insight into why the SPI is low. That is, only a small number of dimensions may provide relevant information or a signal to the SPI problem.

Without the automated insights techniques described herein, the user would have to know themselves where to look next in order to diagnose the surfaced issue. For example, the user would have to know the numerous different ways or paths of drilling down in the user interface. For example, the user would have to decide what particular paths to explore, such as whether it is more important to look at ISP (Internet Service Provider), or more important to look at a specific application version or specific model of device. After making a certain selection based on their own knowledge, they would then drill down further in the UI in an attempt to diagnose the issue. There may be multiple iterations of filtering and drilling down by the user in their attempt to diagnose the issue.

Further, while some metadata, such as that identifying a particular type of device, may be clearly stated, with user-understandable semantic labeling, other metadata may not always be as user-interpretable, in which case, the user may not have as much intuition as to how to drill down further in exploring the issue.

Using the techniques described herein, embodiments of the automated insights system determine optimal exploratory paths for diagnosis of content streaming issues, helping the user to determine how to drill down further into surfaced issues.

The following are further details and embodiments regarding a framework for interactive diagnosis of anomalies in streams of multi-dimensional event data.

FIGS. 2A-2E illustrate an example of automated determination and surfacing of insights. In some embodiments, providing automatic insights includes determining and recommending dimensions of exploration when, for example, navigating and diagnosing issues in content streaming. In some embodiments, the automated insights, as well as the interfaces of FIGS. 2A-2E in which those automated insights are surfaced, are provided by a system such as analytics platform 102 of FIG. 1.

Figure 2A:
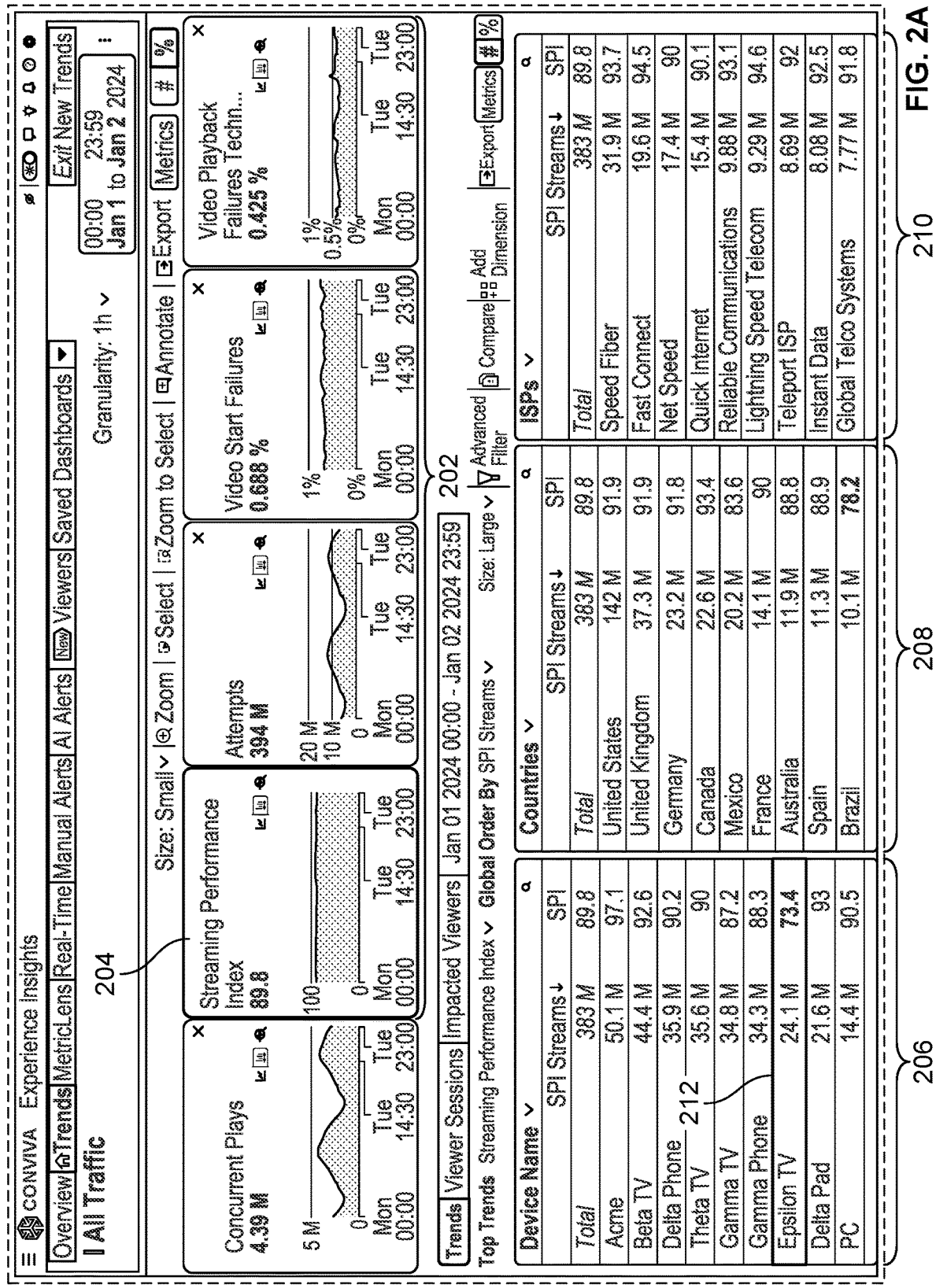
FIGS. 2A-2E illustrate an example of automated determination and surfacing of insights.

FIG. 2A illustrates an example of an analytics dashboard. In this example, an overview of all traffic (e.g., all streaming session traffic) is shown. For example, an analyst user (e.g., user of device 120) starts analysis from a view of all traffic.

In this example, various aggregate performance metrics (e.g., streaming performance index (SPI), attempts, video start failures, video playback failures, etc.) determined by aggregating the session-level metric (for all traffic) are shown at 202. In this example, suppose that the user is interested in the streaming performance index metric 204.

In this example, based on the selection of the SPI metric, the dashboard provides summary information showing trends in the streaming performance metric across an initial set of dimensions. For example, at panel 206 are shown SPI values for sessions grouped according to different values of the dimension device name. At panel 208 are shown SPI values for sessions grouped by different countries under the countries dimension. At panel 210 are shown SPI values for sessions grouped by different ISPs.

In this example, having started analysis from a view of all traffic, the user (e.g., of device 120) notices that Epsilon TV (212) has the poorest performance based on the SPI (streaming performance index) metric under the device name dimension. Having noticed that Epsilon TV is having issues related to streaming performance, suppose that the user would now like to diagnose the issue further.

In the example of FIGS. 2A-2E, for illustrative purposes, SPI values are rated according to a three-level scale of poor, fair, and good. For illustrative purposes, poor SPI values are indicated by being both bolded and underlined, fair SPI values are indicated by being bolded but not underlined, and good SPI values are not bolded and not underlined. Other scales for rating SPI values, as well as other visual indicators for SPI value ratings may be utilized as appropriate.

For example, the user wishes to determine if there is some other characteristic of the Epsilon TV sessions (e.g., browser version, CDN, or any other dimensions) that would be indicative of the cause of the observed low SPI value.

Figure 2B:
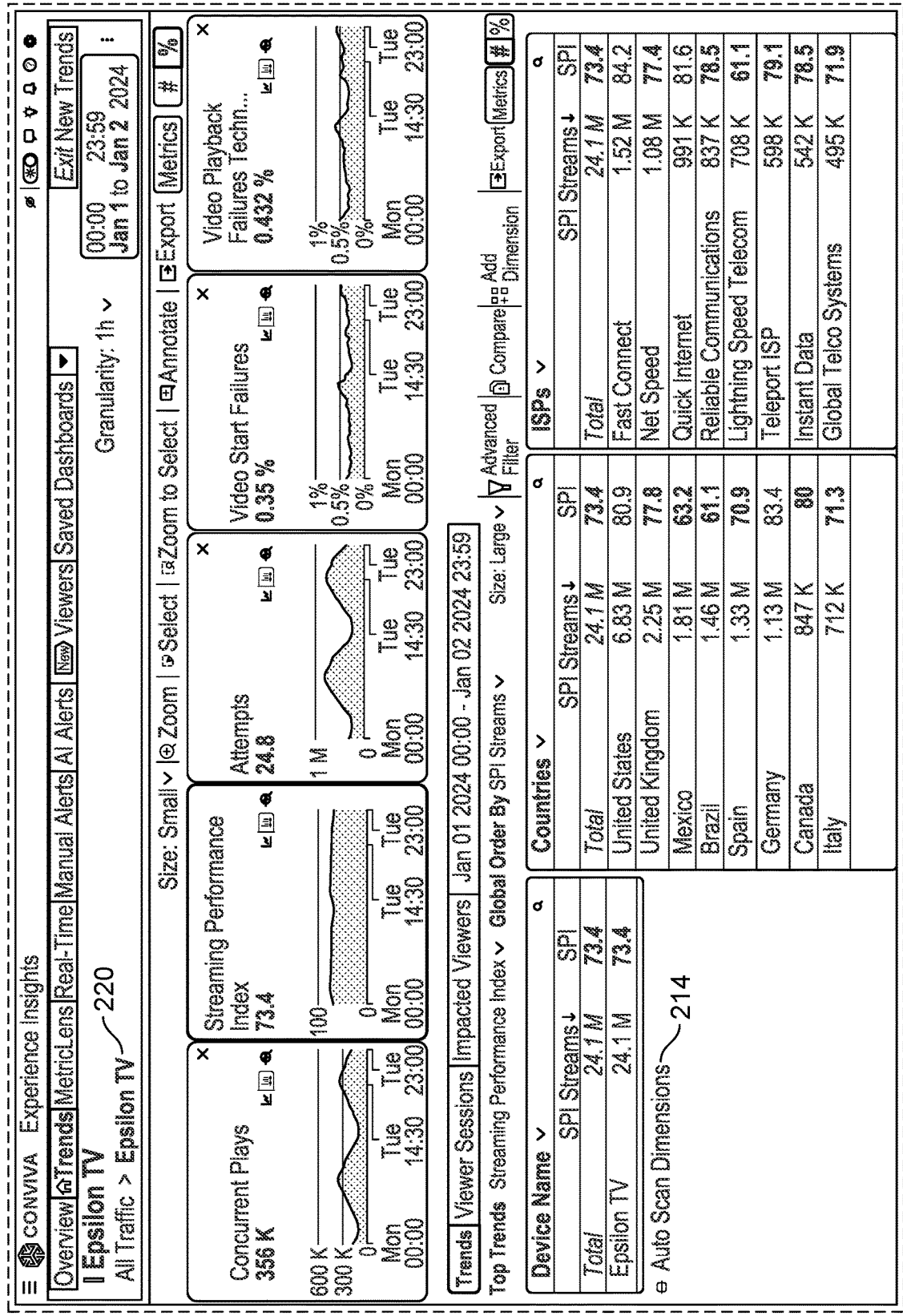

In this example, suppose that the user selects Epsilon TV at 212. The user interface of FIG. 2B is generated in response. In this example, in response to the user clicking on Epsilon TV to drill down to Epsilon TV in the device name dimension, the entire interface of FIG. 2B is now filtered on Epsilon TV (as indicated at 220). For example, rather than viewing SPI across all traffic, the scope of the sessions being evaluated has now been filtered (down from all traffic) to those sessions that were played on Epsilon TV devices. In this case, the space of sessions under consideration has been constrained to a smaller space—that is, a filtered subset of sessions that are played on Epsilon TV devices.

In this example, the system provides, via the user interface at 214, an option to perform auto-scanning of dimensions. Without the user having to explicitly specify where to go next (e.g., what next level of dimensions that they would like to filter on), system 102, in response to selecting the option to perform auto scanning of dimensions, is triggered to perform an automated scan of dimensions (with respect to sessions played on Epsilon TV devices) and determine, from the numerous available dimensions, recommended dimensions or exploratory paths for the user to further drill down into. The optimal or recommended exploratory paths are then presented to the user.

In this example, in response to clicking on the user interface option to auto scan dimensions (214), dimension scanning and recommendation engine 124 automatically scans the available remaining dimensions (in this example, as a value of the device name dimension has already been selected for filtering sessions, the device name dimension is not further evaluated) and recommend dimensions for further exploration (e.g., to view the SPI metrics of).

In some embodiments, performing the scan includes automatically searching the space of dimensions, and determining optimal candidate exploratory or investigatory paths for navigating and diagnosing content streaming issues. For example, in response to the user's indication to further explore a particular content streaming issue, potential paths to drill down that have a high likelihood of providing useful information in diagnosing of the particular streaming issue are identified as surfaced. For example, in response to the user clicking on the option to auto scan dimensions, the system is triggered to recommend dimensions to look at that have the most relevant information. In some embodiments, the recommended candidate dimensions or paths are probabilistically determined. Further details regarding dimension scanning and recommendation are described below.

In some embodiments, the recommended dimensions determined by the dimension scanning and recommendation engine 124 for the next level of exploration are surfaced. For example, in response to the user clicking on the option to perform auto-scanning of dimensions, the system responds with top recommended dimensions. For example, the top recommended dimensions are surfaced in an updated interface such as the example user interface of FIG. 2C. In this example, the top recommended dimensions for the next level of exploration are shown at 222.

Figure 2C:
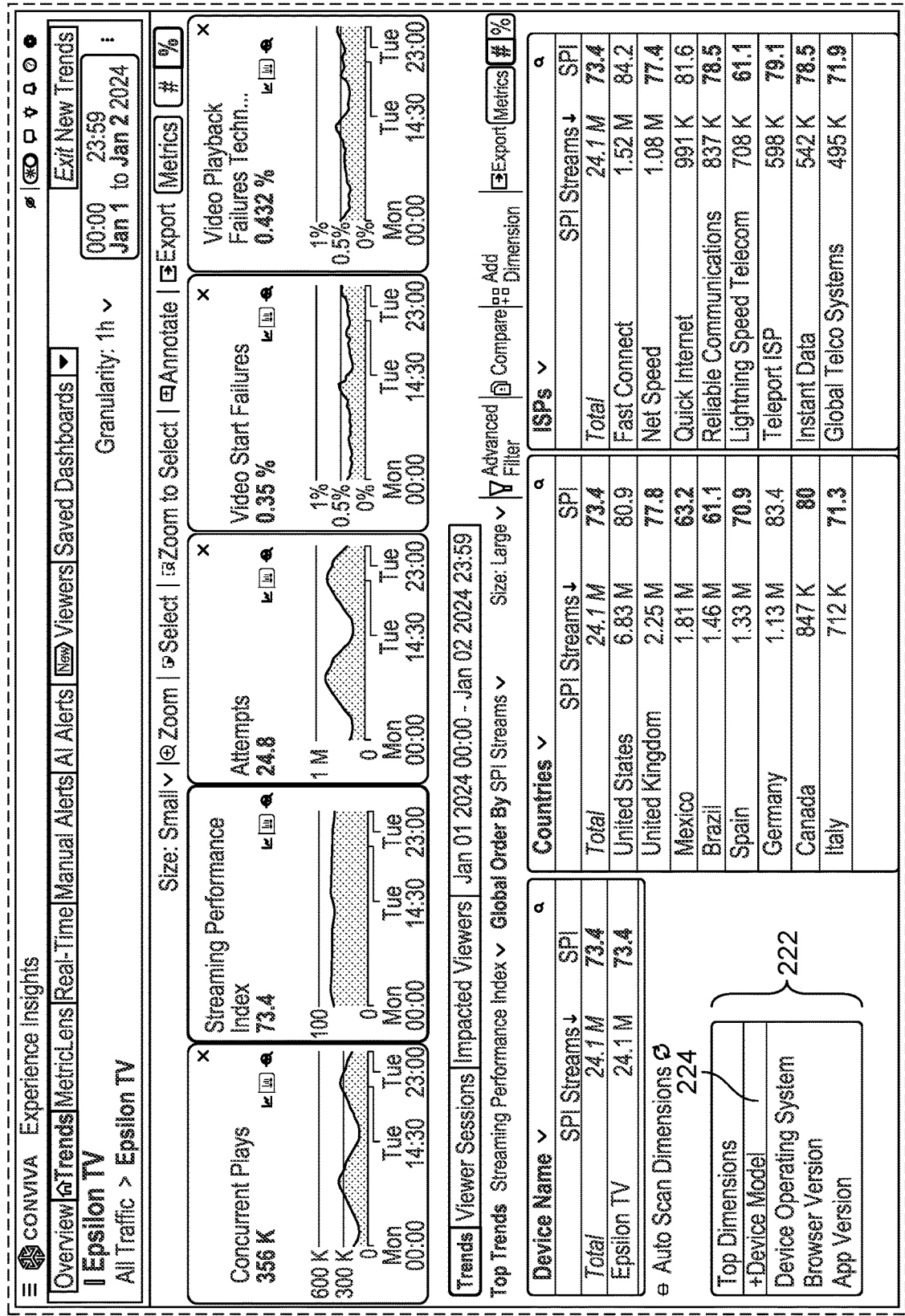

In the example interface of FIG. 2C, at 222, the top four potential dimensions/paths to drill down that will provide relevant information on the particular content streaming issue with respect to SPI are shown. In this example, the four potential paths (e.g., next dimension to filter on for a next level of exploration) that are surfaced include device model, device operating system, browser version, and app version. The four potential dimensions have been identified from the set of all possible dimensions (which, for example, may be in the hundreds).

In this example, each of the surfaced recommended candidate paths is presented as a selectable option in the user interface. For example, the user can click or select each of the device model or operating system for further evaluation, in which deeper information is provided. In this example, the system provides the user an option to ask the system for assistance in exploring and diagnosing a content streaming issue.

Figure 2D:
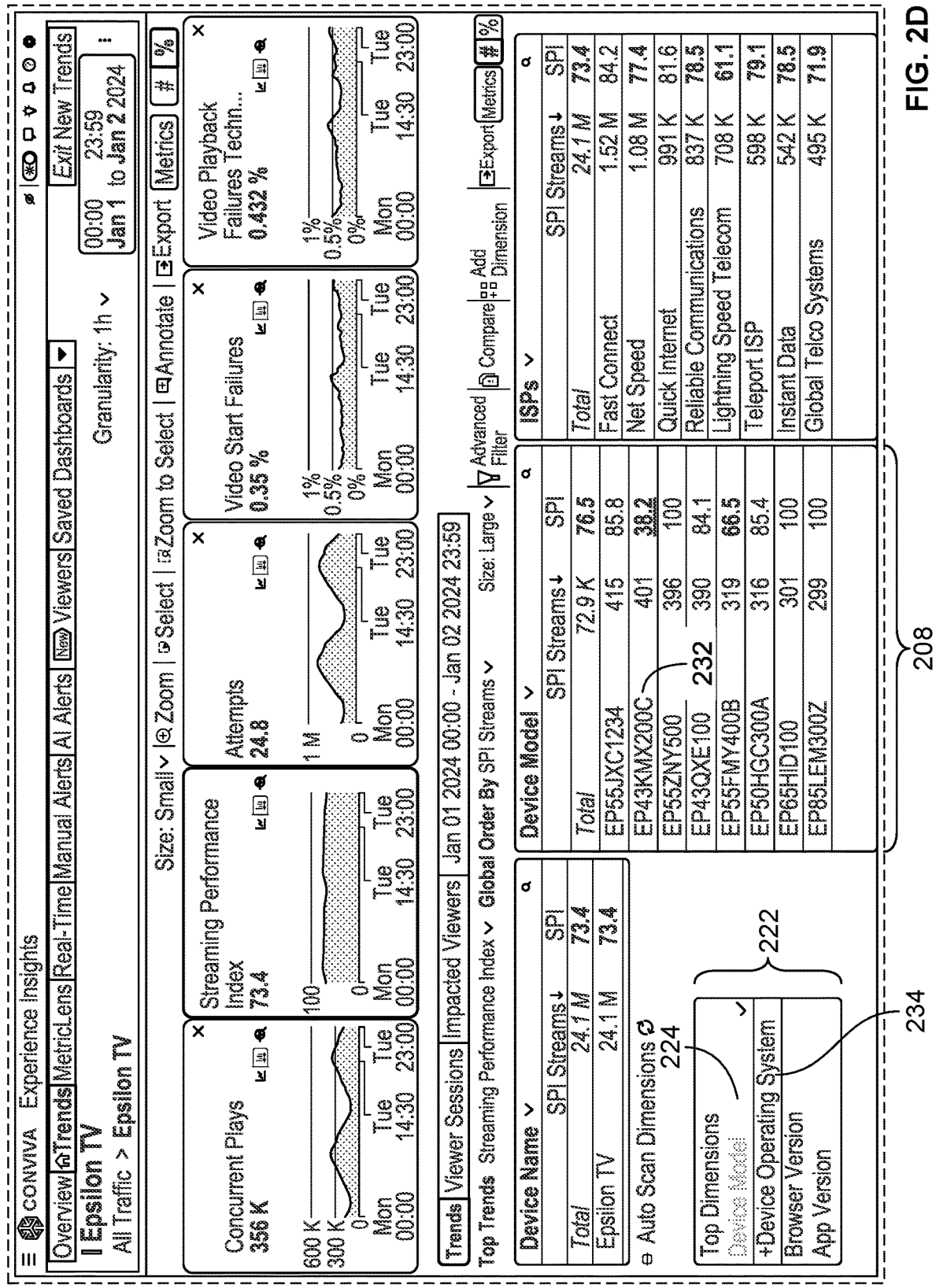
Figure 2E:
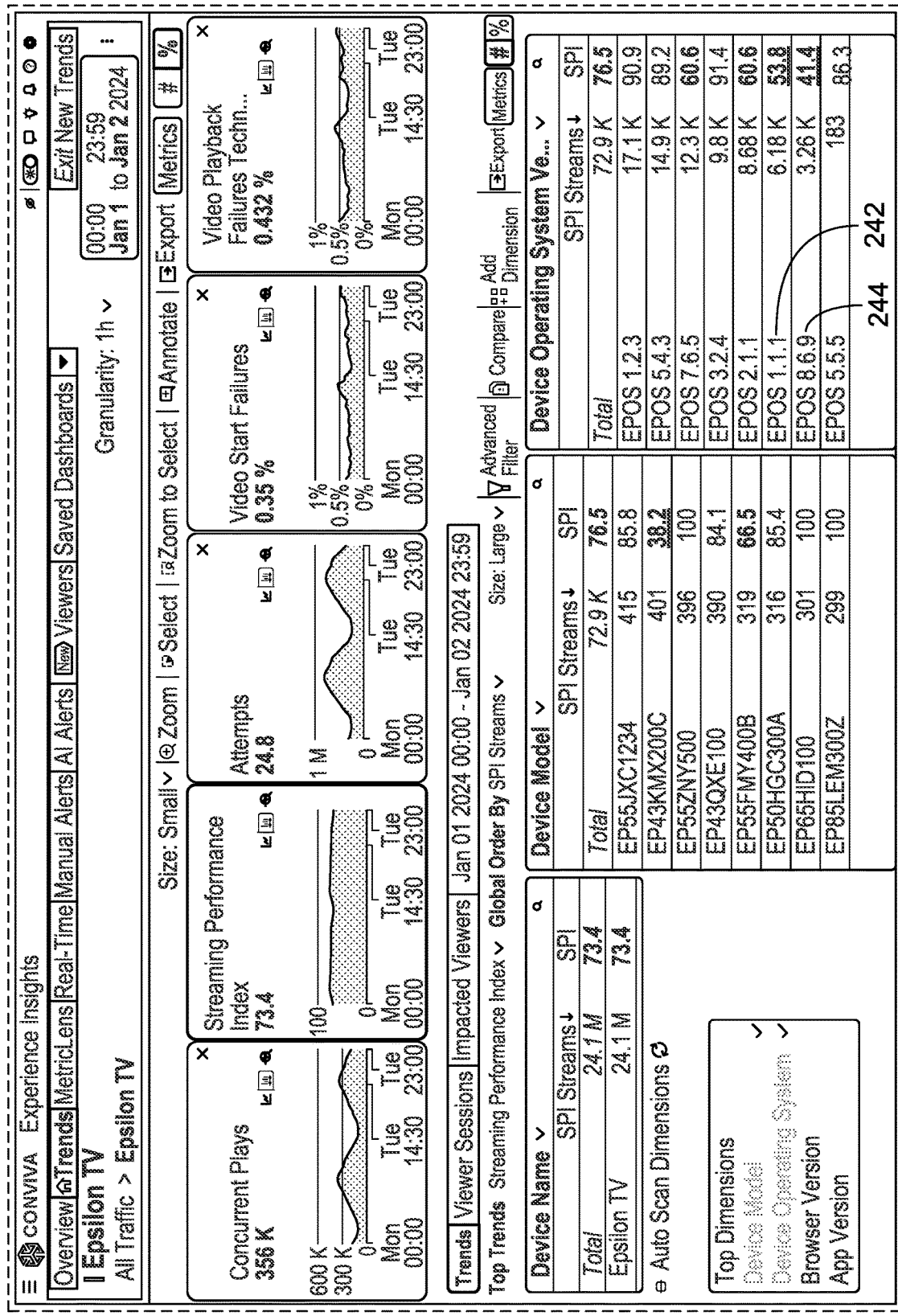

In this example, suppose that the user selects option 224 to further explore along the recommended "device model" dimension. In response, the system performs analytics on the Epsilon TV streaming sessions according to the various different types of device models. The system further provides an updated user interface as shown in the example of FIG. 2D. In the example interface of FIG. 2D, panel 208 is updated to now show SPI values for the Epsilon TV session grouped by device model. In this example, the user can now see, at 232, that device model EP43KMX200C is the worst performing device model.

In this example interface of FIG. 2D, the recommended top dimensions 222 are shown. The user interface element or option to select the recommended dimension of device model (224) is now unavailable (and grayed out in this example to indicate its unavailability), as it has already been selected (and shown at panel 208). If the user would like to explore another path of investigation, the user can further select another exploratory dimension recommended by the automated insights system, such as option 234 for exploring the device operating system dimension.

For example, suppose that the user selects option 234. In response, the system determines analytics for Epsilon TV devices along the dimension of the device operating system, and updates the user interface to that shown in the example of FIG. 2E. In this example, in response to clicking on the recommended device operating system, panel 210 is updated to show SPI values for Epsilon TV sessions grouped or segmented by device operating system. From this updated table, the user can observe that EPOS 1.1.1 (242) and 8.6.9 (244) are the worst performing device operating systems. In the example interface of FIG. 2E, the user can now view, side-by-side, the SPI metric for streaming sessions on Epsilon TVs by both device model (as shown at panel 208) and device operating system (as shown at panel 210). In this example, the device model and device operating system dimensions were recommended (out of the possible space of all available dimensions) to the user by the system, without the user themselves having to explicitly indicate or know what dimensions to filter on. This improves the efficiency of searching and identifying dimensions of interest and potential importance with respect to streaming performance.

The following is an example of scanning dimensions and recommending potentially significant dimensions. In the following, an example of recommending the device model dimension as a result of scanning of dimensions is described (e.g., to generate and surface recommendation 224 of FIG. 2C).

In this example, the system begins with the set of sessions that are tagged with the device name "Epsilon TV" (according to the filter scope). The system then scans and evaluates the SPI of the filtered set of sessions with respect to other dimensions (for example, dimensions other than the device name dimension, for which the value "Epsilon TV" has already been selected and used to constrain the space of sessions that are evaluated).

For example, in addition to scanning the device model dimension, the system also scans dimensions such as operating system, CDN, origin server, ISP, geographic region, etc.

In the following example, suppose that the device model dimension is being evaluated to see if it is a dimension that is potentially significant with respect to streaming performance (and should thus be recommended for further exploration).

In this example, as part of performing a scan of the device model dimension for sessions that are tagged with or fall under the Epsilon TV device name, the system evaluates the performance of different cohorts that correspond to Epsilon TV sessions grouped by different device model numbers (which are the values of the device model dimension).

For example, the system is configured to determine, among the various different device model identifiers, which device models are outliers with respect to the SPI metric. In this example, an outlier refers to a cohort (corresponding to a specific device model identifier) that has a cohort-level measured SPI that is below an outlier threshold.

In some embodiments, in order to determine the presence of outliers among the different device models, a distribution is applied based on the histogram of empirical SPI measures for the different cohorts of Epsilon TV sessions grouped by device model. The statistics of the fitted distribution are used to define the conditions for determining outliers. For example, an outlier can be defined as any SPI value that is lower than, for example, a tail percentile, such as lower than the fifth percentile, or lower than the second percentile.

In this example, a tail percentile (statistical parameter of the fitted distribution) is used as a threshold for determining the presence of outlier cohorts. As one example, the SPI value that corresponds to the tail percentile can be used as the threshold to provide a cutoff for determining which device models have an SPI value lower than the threshold. The cutoff threshold includes an SPI value determined based on tail percentiles that is used to determine whether some group of sessions (grouped based on dimension value) is an outlier.

In this example, the system is configured to identify outliers among the cohort-level SPI metric values determined for each cohort of sessions grouped by device model. As one example, among all of the device model cohorts for a same period of time (e.g., the past week, past day, etc.), the aggregate, cohort-level metric value corresponding to each device model (which is determined by aggregating the SPI metric values for individual sessions in the cohort of sessions that share a common device model) is determined. The cohort-level metrics are collected together to form a histogram of cohort-level SPI metric values. A probability distribution is fitted over the histogram of cohort-level SPI metric values. For example, if there are 100 different device model identifiers (cardinality of the device model dimension), then 100 corresponding cohort-level SPI metric values are determined. A continuous probability distribution is fit over the 100 cohort SPI metric values. An outlier threshold SPI value is determined. Any cohorts (corresponding to specific device model identifiers) that had corresponding cohort-level SPI values below the threshold are determined as being outlier cohorts.

As shown in this example, empirical performance metric data is determined for cohorts corresponding to different dimension values of a dimension being analyzed. A (continuous) distribution is fitted to the empirical performance metric data (aggregate, cohort-level performance metric values determined for the cohorts). Statistical parameters of the fitted distribution are determined, such as tail percentiles. In some embodiments, a tail percentile is used as a threshold for detecting cohorts that are outliers with respect to the performance metric. After the distribution is fitted, the system returns to the empirical data to find any cohorts whose corresponding metric value falls below the tail percentile threshold determined from the fitted distribution. If a cohort's SPI is below the threshold, then the dimension value corresponding to the cohort is determined to be an outlier. Presence of an outlier in the dimension is also determined to have been detected. The presence of an outlier is indicative of the dimension being potentially significant with respect to performance.

If the analyzed dimension is found to have dimension values that are outliers, then the dimension is surfaced, as was the case for the device model, which was recommended, as shown at 224 of FIG. 2D. Further, when the user selects the device model for further exploration, the cohort-level performance measures are also shown. In the example of FIG. 2D, the device model identifier that was determined to be an outlier cohort (232) is also indicated in the user interface.

It may be the case that none of the cohorts have actual empirical performance metric values that fall below the threshold determined from the fitted distribution. In some embodiments, if the presence of outliers is not detected for a candidate dimension, that dimension is not surfaced. For example, if no outliers were detected for the CDN dimension, then the CDN dimension is not surfaced. As shown in this example, the system described herein is configured to automatically recommend dimensions such as device model to explore further, without surfacing other dimensions (such as CDN in this example) that are not potentially significant, and which would not provide much insight into observed streaming performance issues (as measured with respect to a performance metric SPI in these examples). The presence of outliers in the device model dimension is used as a signal for indicating that this dimension is of potential significance with respect to streaming performance.

As shown in the examples above, a first question that the system answers is whether there are any outliers in a candidate dimension under evaluation. For example, does the device model have outliers for the metric of interest (SPI) within the filter scope (population of Epsilon TV sessions). In this example scenario, when evaluating the SPI (metric for gauging performance) for Epsilon TV, the system determines whether dimensions such as the device model dimension have any outliers, etc. An evaluation is done across all candidate dimensions (excluding those dimensions for which a specific value was selected as a filter to constrain the set of sessions whose SPI performance is evaluated) to determine which dimensions have outliers. This includes fitting a distribution to the empirically observed performance grouped/aggregated according to values of a dimension. Different dimensions may have different distributions (of different shapes) fitted to the histograms of cohort-level performance measures due to the shape of the empirical data. The statistical parameters of the fitted distribution are used to determine any outlier dimension values among the values for the dimension.

Any dimensions for which the presence of outlier cohorts is detected are suggested and surfaced to the user (so that the user can further evaluate the system-recommended dimensions). Dimensions that do not have any outliers are not surfaced in some embodiments. The user can then select a dimension (via a UI) and visually scan through the presented SPI values for the dimension selected from the recommended dimensions to determine what the outlier is. In the above examples of FIGS. 2A-2E, the system determines that the device model dimension has an outlier and that it should be surfaced for the user to have the option to further explore.

As another example of the automated dimension scanning and surfacing described above, suppose that there are 100 dimensions in all. One of the dimensions is device name. In this example, as shown at 212 of FIG. 2A, the user selected the Epsilon TV value under the device name dimension as a filter that restricts or constrains the space of sessions that are evaluated (e.g., sessions that share the characteristic of having been played on Epsilon TVs). Of the remaining 99 dimensions (where the device name dimension is not evaluated again, since the Epsilon TV value for the dimension has already been selected as a filter), any dimensions with outliers are surfaced. For example, at FIG. 2D, in response to selecting the recommended device model dimension, the SPI measured for different device model identifiers is displayed at 208. In this example, the user can then select a device model to further constrain the space or scope of sessions being evaluated. For example, as part of the iterative investigatory process, the user then selects the device model "EP43KMX200C" at 232, as it has a low SPI value. In this example, the investigatory filter scope is updated to include the combination of both the Epsilon TV device name dimension value, and the EP43KMX200C device model dimension value. This further constrains the space of sessions whose SPI performance is evaluated to those that were played on Epsilon TVs with device model number EP43KMX200C.

In this example, the filter scope is now updated to be (device name==Epsilon TV AND device model==EP43KMX200C). That is, each time of iteration (e.g., selection of a specific dimension value), the filter scope is updated. By expanding the filter scope, the search space of sessions is further constrained as conditions are added, where the filter conditions are determined from the dimensions.

The user can then request for another iteration of dimension scanning and recommendation to be performed. In this example, the updated filter scope then further constrains the space of sessions that is evaluated in the next iteration. In this example, the added filter condition is a specific value for a dimension. In the next iteration of scanning of outliers, that dimension is no longer scanned again, as one value for that dimension has already been selected. The remaining dimensions are scanned.

In some embodiments, the filter scope can be updated with multiple dimension values. For example, suppose that in a previous round of iteration, the user had selected the Epsilon TV dimension value (from the device name dimension) for exploration. Suppose that the user then requested recommended dimensions to explore. In the current iteration, suppose that the system recommends the device model dimension. Suppose that there are three specific device models (device model dimension values) that are outliers (with respect to the SPI metric in this example). The user may select all three of the outlier device models for updating. This results in the filter scope being updated to be Epsilon TV and any of the selected device models (e.g., Epsilon TV AND (device_model_1 OR device_model_2 OR device_model_3)). Once filtering has been performed on the device model dimension (whether filtering on one or more multiple values of the dimensions), that dimension is excluded from future scanning/analysis. Suppose for example, if during a first iteration, one hundred dimensions were scanned. A user then selects a value of a particular dimension for updating the filter scope. In the next iteration, ninety-nine dimensions are scanned (the dimension for which a value was chosen for filtering in a next round of scanning is removed). As shown in this example, the filter scope is an expression for determining what streaming sessions to include for evaluation when scanning candidate dimensions.

As shown in the above examples, the system provides the capability for a user to request for assistance in diagnosing content streaming issues. In response to such a request, the system is triggered to search the space of available dimensions, identify recommended dimensions for further evaluation, and return (e.g., surface) the recommended dimensions of exploration. This is in contrast to forcing the user to figure out such exploratory dimensions.

In the examples of FIGS. 2A-2E, the capability of automatic scanning of dimensions to identify recommended dimensions for exploration assisted the user to find the most relevant dimensions that will provide the next step of analysis across potentially hundreds of different dimensions, without the user having to know what specific path would be the most optimal to explore. For example, the auto-scanning feature assisted the user in finding the most relevant dimension and relevant dimension value to identify actions quickly out of potentially hundreds of dimensions and millions of values.

Without the auto-scanning techniques described herein, the user may have to search all of the potentially hundreds of dimensions when attempting to diagnose a content streaming issue. For example, the user would have to know from experience or check dimensions one by one to find relevant information to determine actions.

In the example above, device model and operating system were explored. The scanning and exploratory techniques described herein are applicable to any dimension across content, delivery (e.g., CDN, ISP), geographic region, as well as custom dimensions provided by users (e.g., tags set by subscribers of the services provided by the streaming analytics platform).

While examples of automated scanning and recommending of exploratory dimensions are provided in the context of content streaming, the techniques described herein may be variously adapted to accommodate other types of use cases and types of data.

In some embodiments, using the techniques described herein, a framework is provided that facilitates collaborative and interactive diagnosis, in which both user experience and automated insights capabilities are bridged and integrated with each other. For example, as shown in the examples of FIGS. 2A-2E, the user can use a UI or other interface to initiate analysis. At a certain point, the user can then hand off the analysis to platform 102 to perform automated scanning of dimensions to perform further analysis and return results. The user may then continue by selecting from the recommended dimensions. This collaborative investigatory process can be iterated multiple times.

The collaborative framework for interactive diagnosis involving feedback-based automated scanning (in which the platform provides the ability for users and the platform to provide signals to each other) provides various benefits. For example, given the potentially hundreds of dimensions and millions of dimension values, it may be computationally intractable for a model to process or computationally explore all possible paths of combinations of dimensions and dimension values to find what group of sessions (with some certain specific set of dimension values as characteristics) is responsible for observed content streaming issues. Using the techniques described herein, the system provides feedback capabilities in which users can provide feedback about analysis they would like to perform, where the user input is used as feedback by the system model to guide or influence its determination of recommended dimensions for exploration. For example, the system provides a recommended subset of candidate dimensions to explore. The user provides input such as a selection of a surfaced dimension. The user input is used as feedback by the automated insights model to limit the search space over which the system processes performance data pertaining to streaming sessions. In this way, by reducing the scope of the search space, the automated diagnosing by the model is made more efficient and less resource intensive.

Further, by performing iterative analysis with user feedback interaction, what combination of what dimensions and dimension values can be evaluated can be scaled. For example, suppose that there are streaming sessions that can be segmented by 500 different dimensions, where each dimension can have thousands of values. It would be impractical and intractable from a computing perspective to search all combinations of dimensions and dimension values to determine performance (e.g., whether there are streaming performance issues) of various different groups or cohorts of streaming sessions.

While a certain set of cohorts can be selected or pre-configured for a system to search through and evaluate (e.g., to reduce the search space of sessions to evaluate), this pre-configured subset of cohorts that is searched through may only represent a small fraction of the total possible space of combinations that exist. That is, even if a search of the pre-configured set of cohorts is performed, further searching through paths of cohorts may be needed to diagnose a problem. Using the techniques described herein, user feedback is leveraged and combined with automated insights analysis. As one example, suppose that in the example of FIG. 2A, an initial scan of a certain, limited subset of cohorts indicated that sessions for which the device name was Epsilon TV were identified as having streaming performance issues with respect to SPI. The alerting system may not be able to scan the rest of the space (as it would be intractable from a computational perspective). Using the techniques described herein, user feedback is collected and used as a signal to narrow down the search space for the automated insights platform to further explore. Using the techniques described herein, in taking the user feedback into account, the system is better able to determine and present a set of candidate paths to the user to select from. In this way, the user feedback is directed with the assistance of analysis of probable paths (which the user may not be aware of). In this way, the system provides guidance to the user on probable paths of investigation with a high probability of providing useful information. The user can then also provide guidance to the system by selection of a candidate path, in response to which the system can perform scanning on a narrower search space based on the user's signal. Here, the user provides a signal to the system of the sub-space of combinations of dimensions and dimension values within which to search and evaluate performance. As will be described in further detail below, in some embodiments, the determination and surfacing of candidate or recommended search paths is performed in real-time, to facilitate real-time dynamic querying and searching of a search space. Using the techniques described herein, user domain feedback is leveraged and combined with automated insights capability to improve the efficiency and efficacy of searching through and evaluating the space of combinations of dimensions and dimensions values to support and facilitate real-time diagnosis of streaming performance issues at a granular level (narrowing down to a specific combination of dimensions and dimension values). Using the techniques described herein, a user is able to dynamically provide a search space for the system, such that the system can react to the user feedback signal when performing analysis of streaming performance issues across streaming sessions.

Such interactive search space exploration is in contrast to pre-programming a search space over which data is evaluated. For example, using the techniques described herein, the system is dynamically guided by feedback from a user. For example, the system determines recommended options that are provided to the user. The user implicitly guides the system by selecting or drilling down on one of the recommended options, indicating the direction (and search space) of interest. For example, in the example of FIG. 2A, by clicking on Epsilon TV (212), the user has dynamically indicated to the system that the system should focus within the space of Epsilon TV sessions. This eliminates trillions of combinations that the system (which has a global view of streaming performance of data across sessions running on disparate types of devices with disparate types of operating systems, on different ISPs, etc.) would otherwise have to evaluate.

Using the techniques described herein, a user is provided a channel by which to guide the automated insights platform on the space over which it performs analysis. This is facilitated by an interactive, and reactive querying framework for analysis, utilizing feedback from a user as directional guidance to dynamically search through the space of combinations of dimensions and dimension values. This is also facilitated by the system providing guidance (e.g., in the form of recommended search dimensions for further exploration, in which case the system is also reducing the search or evaluation space for the user) to the user, such that the user can provide their guidance by being able to view results (e.g., performance measurements for certain segments or cohorts of sessions) in real-time. For example, the user provides guidance as they are performing analysis based on the query results data being provided. Using the techniques described herein, iterative and collaborative search space exploration is facilitated, where the system provides recommended dimensions, helping to reduce the search space for the user, where feedback provided by the user also reduces the search space for the system. This back-and further search space narrowing with mutual user-system guidance can be repeated over multiple iterations. As a result, compared to existing techniques such as those that are pre-configured to search in a small percentage of the entire search space, embodiments of the system (along with the user) are able to search the entire space, thereby scaling and improving the efficacy of the results provided (e.g., by increasing the speed at which a search space can be covered or navigated). Further details regarding facilitating real-time dynamic querying and search space exploration are described below.

Further Embodiments of Automated Dimension Scanning and Recommendation

The following are further embodiments of automatic scanning and recommending of dimensions for diagnosing issues in multi-dimensional streaming information. In this example, automated dimension scanning and recommending to facilitate the diagnosis or analysis of streaming performance issues indicated via the SPI metric are described for illustrative purposes. The techniques described herein may be variously adapted to accommodate debugging and diagnosis with respect to other metrics as appropriate, such as rebuffering. In this example, SPI is a composite metric or score that is composed based on other metrics such as buffering ratio, bitrate, failure, start time, etc. While examples involving SPI are described herein for illustrative purposes, the analytics described herein can be used to diagnose streaming issues determined relative to multiple metrics or combinations of metrics (e.g., buffering, video start failures, etc.).

In some embodiments, dimension scanning and recommendation engine 124 is configured to provide scan and recommended dimensions as suggested or candidate search paths (e.g., to highlight the performance of certain subsets of sessions with a certain set of characteristics that are of potential significance). In some embodiments, to facilitate query-time processing (e.g., to dynamically update the interfaces shown in FIGS. 2A-2E in response to user interactions in near real-time), the dimension scanning and recommendation engine 124 is implemented as a microservice accessing a high-performance database (such as data store 118, implemented using, for example, Apache Druid, Clickhouse, etc.) that can be queried quickly.

In some embodiments, a dimension is recommended or surfaced where the performance of a group of sessions sharing a certain value of the dimension is an outlier. In this example, this includes surfacing, bubbling up, or suggesting dimensions where the SPI values of at least one cohort (corresponding to a value of the dimension) are relatively low within that dimension—for example, some older browser versions (where there is a browser version dimension, a specific browser version is an example value of the browser dimension) may have much worse performance compared to other browser versions. Bringing dimensions that have the presence of such outlier dimension values to the attention of users can facilitate diagnosis of the cause of streaming issues.

As one example, suppose a dimension, "device." Under this dimension, there may be tens or hundreds of different values. A group of sessions that share a certain value of the dimension is referred to herein as a cohort. Cohorts may also be determined as a group of sessions sharing a combination of dimension values.

In the following examples, dimension scanning and recommendation engine 124 is configured to determine outlier cohorts (outlier dimension values) in terms of the metric, SPI. This includes determining outlier values of a metric in groups of sessions matching to specific values of a particular dimension being scanned. Surfacing of such outlier cohorts would be beneficial when diagnosing streaming performance. For example, it would be beneficial to a user if the system were able to provide an indication of device name dimension values (cohorts), whose aggregate SPI metric for the sessions sharing those dimension values are outliers. In this example, dimension scanning and recommendation engine 124 is configured to identify, out of all of the possible existing dimensions (which may be in the hundreds), which dimensions have enough key outliers in the SPI metric that they should be surfaced to the user.

The following are examples of reliably scanning a dimension for the presence of outlier cohorts corresponding to values of the scanned dimension. In some embodiments, scanning a candidate dimension includes aggregating a set of sessions matching to a filter scope. In some embodiments, filter scope engine 126 is configured to determine a set of streaming sessions that are filtered according to a filter scope (e.g., that match the conditions of the filter scope). In some embodiments, the session-level information that is aggregated is also determined to be within a time period of interest (e.g., last hour, last day, last week, etc.).

In some embodiments, a group of streaming sessions matching to a filter scope is obtained. For example, UI frontend 122 is configured to receive an indication of a filter scope for sessions to be evaluated. For example, based on the user selecting Epsilon TV at 212, the scope of sessions to be evaluated is filtered to those sessions that were played on Epsilon TV (e.g., sessions that are tagged with metadata indicating that they were played on devices with the device name of Epsilon TV). Filter scope engine 126 is configured to determine the set of sessions under Epsilon TV in this example.

A set of dimensions is then scanned to determine which dimensions contain outliers. In some embodiments, candidate dimension evaluation engine 128 is configured to evaluate a candidate dimension to determine whether it is of potential significance (and should be surfaced). Embodiments of the candidate dimension evaluation described herein are performed for each candidate dimension under consideration. In some embodiments, dimensions whose values that are included in the filter scope (where specific values of dimensions have already been specified) are not further evaluated. For example, as Epsilon TV has been selected as a specific device name for filtering sessions, the "device name" dimension is not further evaluated. The remaining dimensions are then evaluated as candidate dimensions. The following are examples of evaluation of a candidate dimension.

In some embodiments, evaluating a candidate dimension includes determining whether the dimension is potentially significant. As one example, a potentially significant dimension is a dimension that is identified as significantly affecting streaming performance.

In some embodiments, the set of sessions matching to the filter scope is partitioned or segmented or grouped into cohorts of sessions, where a cohort corresponds to a value of the candidate dimension being evaluated, and where the sessions in the cohort are tagged or otherwise characterized as sharing the dimension value in common.

For example, a candidate dimension of interest is obtained. Suppose that the dimension of interest has multiple dimension values. For example, the "device model" dimension may have as values many different device model numbers. The group of streaming sessions matching to the filter scope is further partitioned by the different dimension values, where each dimension value is associated with a corresponding sub-group of streaming sessions that are tagged with the same value of the dimension. For each sub-group of streaming sessions matching to a particular dimension value (also referred to herein as a cohort), a corresponding cohort-level aggregate performance metric value (aggregate SPI metric value in this example) for the sub-group is determined.

A cohort-level performance measure is determined for a given cohort by aggregating the session-level performance measures for the sessions belonging to the cohort. In some embodiments, the cohort-level performance measures are determined by cohort performance engine 130.

In some embodiments, the cohort-level performance measures are determined by aggregating the session-level performance measures in store 118. For example, as described above, ingestion processing engine 104 is configured to ingest streams of raw event data. For example, at an individual session level (from streaming sessions running on a streamer's client device), a stream of raw events is collected by platform 102 over time (e.g., every hour, every 10 minutes, etc.). In some embodiments, the platform is configured to compute actionable metrics on the ingested raw data, such as SPI, rebuffering, etc. For example, metrics are computed at a session level by session-level performance metrics computation 116. The session level metrics are then stored to the high-performance database 118.

Aggregation of session-level data (e.g., to determine the SPI for a group or subset of sessions matching a certain set of dimensions/values) is then performed at real-time. This is because the aggregation could be on any arbitrary combination of dimension values (e.g., combination of filter scope and cohort dimension value). Such pre-computation on arbitrary combinations of dimensions would be intractable given the number of combinations of dimensions. As shown in this example, at a session level, the performance metric (used to evaluate streaming performance) for individual sessions is pre-computed and stored (rather than being computed on the fly). The cohort-level aggregate metrics are computed on the fly from the individual session-level measures.

For example, composite metrics such as SPI are complex and intricate, and may involve correlation across ingested events. In some embodiments, the individual session-level metric values are pre-computed on the ingested raw event data and stored to the high-performance data in preparation for being aggregated on the fly according to user input.

For example, for a performance metric such as average bitrate, client devices may not report an average bitrate. Instead, they may report their current bitrate at various points in time. In some embodiments, determining session level metrics includes determining a time period or window of evaluation (e.g., last hour, last week, etc.). A session-level performance metric value for an individual session for that window of time is computed (e.g., based on raw events ingested during that period of interest).

In some embodiments, the system is configured to determine the start and end of streaming sessions (e.g., from the event stream). The system 102 then determines the metric for a session based on computation across events over time (between the determined start and end times), where the session level metrics are then stored. As shown in this example, the performance metric is pre-computed at the session level. During query time, aggregation across sessions (to determine performance of certain cohorts) is performed dynamically. In some embodiments, at query time, the microservice (e.g., dimension scanning and recommendation engine 124) accesses the session level metrics to determine aggregate metric values for cohorts, responsive to a user's input.

In some embodiments, the determination of cohort-level performance measures (of the SPI metric in this example) results in a histogram of cohort-level SPI values. In some embodiments, cohort performance engine 130 is configured to determine a histogram which includes identifying the unique aggregate performance metric SPI values that have been determined. For each observed aggregate performance metric value, a count of the times that the aggregate performance metric value has been observed is determined (for example, a certain aggregate performance metric value may have been seen multiple times). In some embodiments, the histogram is normalized.

In some embodiments, a continuous probability distribution is fit to the histogram of cohort-level performance measures. In some embodiments, distribution fitting engine 132 is configured to fit a distribution to the histogram of cohort-level SPI values.

Properties of the distribution are then used to determine whether any of the cohorts are outliers with respect to the SPI performance metric. In some embodiments, outlier presence detection engine 134 is configured to determine the presence of outlier cohorts. In some embodiments, a statistical parameter of the distribution is used as an outlier threshold. A cohort is determined to be an outlier if its corresponding cohort-level performance measure falls below the threshold.

One way to perform such outlier detection is to assume that there is a certain distribution that the metric, under those specific dimensions, follows. Outlier detection then involves defining an outlier threshold, which as one example, is based on a tail percentile for that fitted distribution. For example, for SPI, a threshold of the $5^{th}$ percentile can be used. As one example, if the $5^{th}$ percentile value for SPI is 50, then any cohort with an SPI value lower than 50 can be considered an outlier.

A dimension may have a large cardinality (e.g., large number of different values under dimension of interest). In some embodiments, a distribution is fit based on individual empirical values (e.g., histogram, as described above, where the empirical cohort-level performance measures may also be considered as samples)). The threshold (e.g., tail percentile) can then be defined based on the fitted distribution.

In some embodiments, if at least one cohort is determined to be an outlier according to the threshold, then the dimension is flagged as being potentially significant. The flagged dimension is then surfaced, such as via a user interface.

The following are further embodiments of outlier detection based on fitting of a distribution to a histogram of cohort performance.

Generating a Histogram of Performance of Cohorts of a Dimension

The following are further details regarding determining, for a candidate dimension, a histogram of performance for different cohorts corresponding to different values of the candidate dimension. In some embodiments, cohort performance engine 130 is configured to determine the histogram for each candidate dimension.

In this example, SPI data is pulled (e.g., daily) on several content publishers (that subscribe to the services provided by the streaming analytics platform described herein) and all of their dimensions. In some embodiments, certain content publisher/dimension values are discarded based on having too low a volume (e.g., below a threshold volume of sessions). For example, client/dimension values with less than 1000 sessions in volume are discarded. In other embodiments, a percentage of total volume is used as a threshold to determine whether to discard values. In some embodiments, the dimension values with the highest volumes are kept (e.g., above a threshold volume, or threshold top percentage).

Figure 3A:
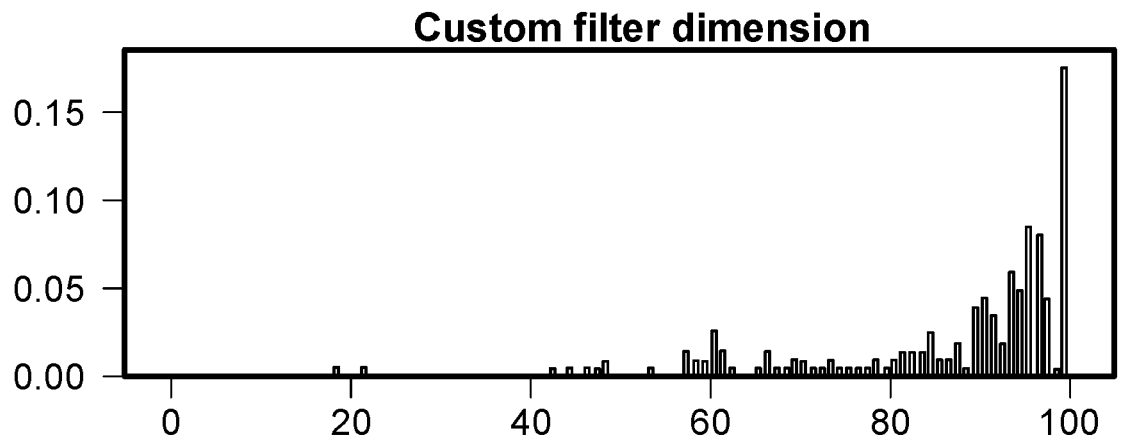
FIGS. 3A-3C illustrate embodiments of histograms of cohort-level performance measures.
Figure 3B:
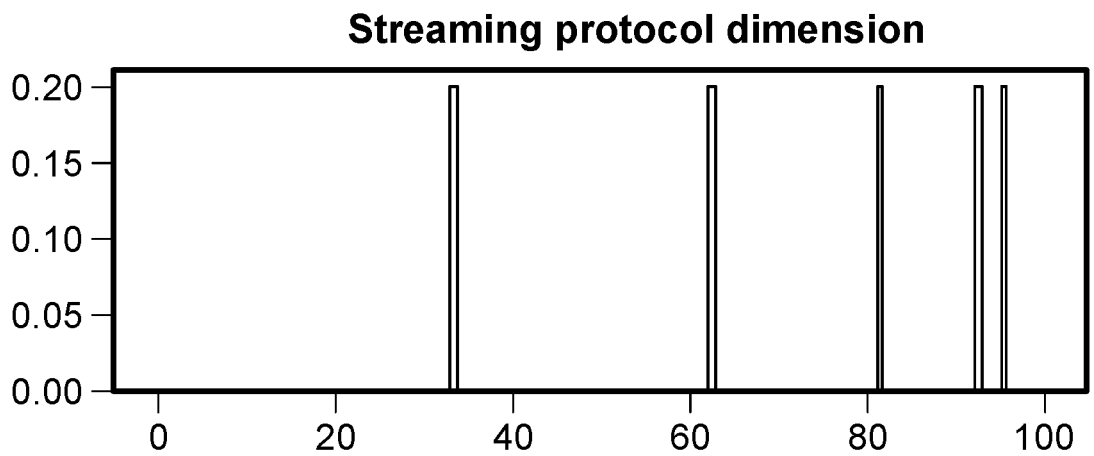
Figure 3C:
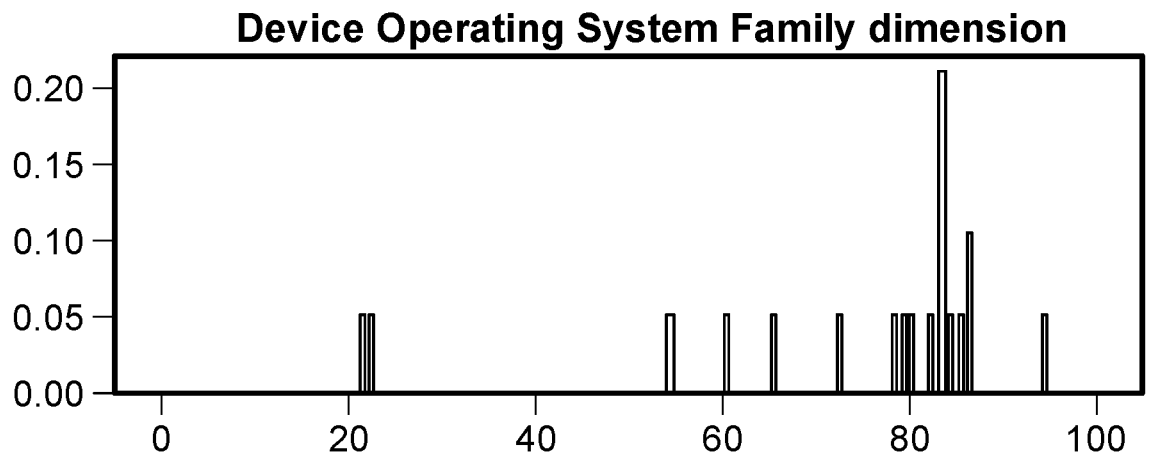

FIGS. 3A-3C are examples of the distribution of SPI metric values determined for sessions in different cohorts. In this example, in each of the graphs, the X-axis is metric values (e.g., SPI values). The Y-axis is the histogram (e.g., number of sessions that had a specific SPI value, or percentage of total sessions of the cohort under consideration that had a particular SPI value). In this example, SPI is normalized to be a score between 0 and 100, with 100 indicating the highest performance, and 0 indicating the lowest performance. Other metrics may have different ranges of values.

In the examples of FIGS. 3A-3C, a normalized histogram is determined (where, for example, the counts of the different aggregate performance metric values are divided by the overall or total number of dimension values), resulting in a probability of some specific aggregate performance metric value occurring (based on empirical data).

FIG. 3A illustrates an example of a histogram of SPI values generated for cohorts of sessions corresponding to different dimension values of a custom filter dimension (e.g., custom dimension that is defined by a content publisher).

FIG. 3B illustrates an example of a histogram of SPI values generated for cohorts of sessions corresponding to different dimension values of a streaming protocol dimension. Examples of different dimension values of the streaming protocol dimension include HLS, Dash, MP4, etc.

FIG. 3C illustrates an example of a histogram of SPI values generated for cohorts of sessions corresponding to different dimension values of a device operating system family dimension. Examples of different dimension values of the device operating system family dimension include iOS, Android, Roku OS, Fire OS, etc.

Embodiments of Fitting a Distribution to a Cohort Performance Histogram

Figure 4A:
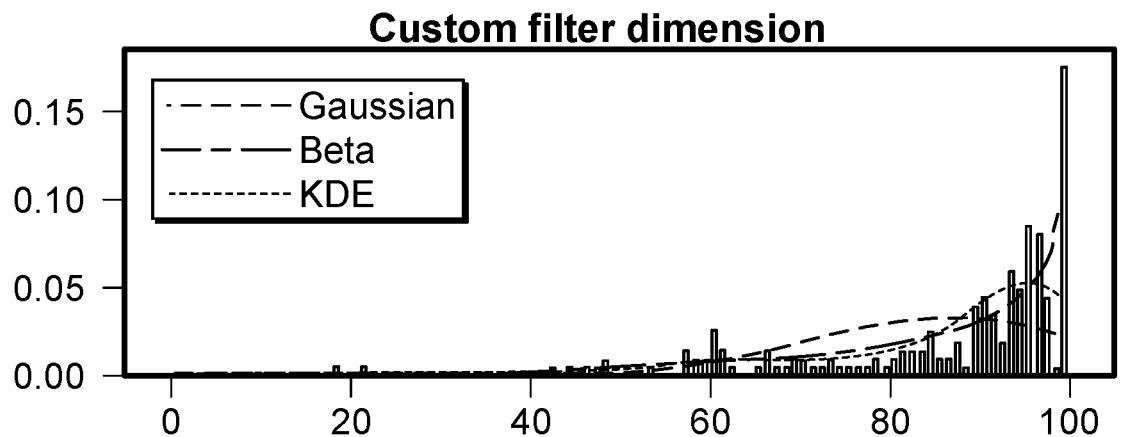
FIGS. 4A-4C illustrate embodiments of distributions fit to histograms of cohort-level performance measures.
Figure 4B:
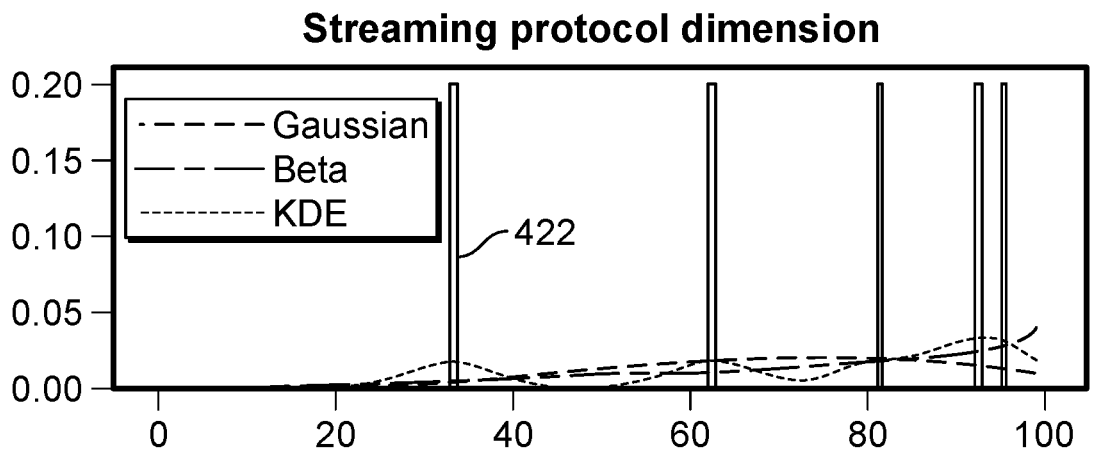
Figure 4C:
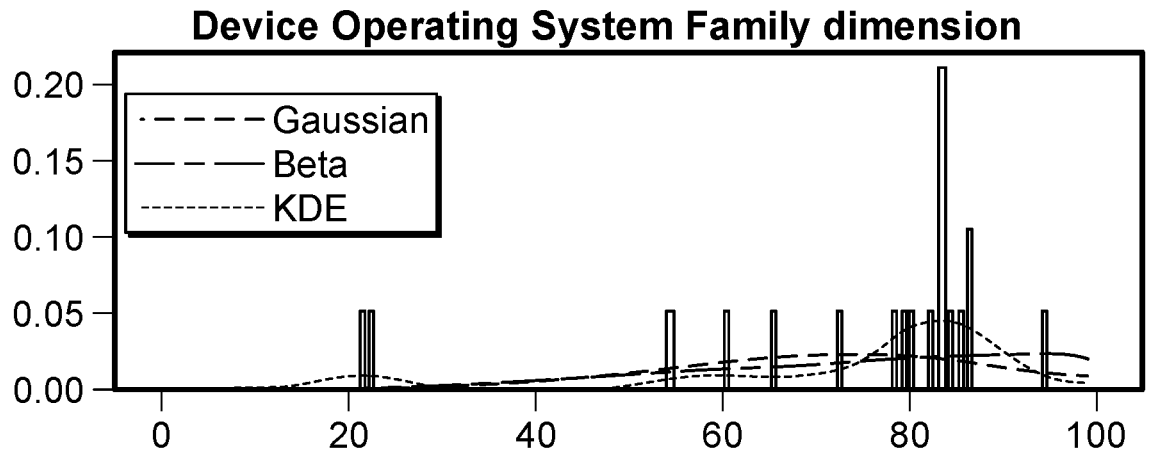

FIGS. 4A-4C illustrate examples of fitting of distributions to the respective histograms shown in FIGS. 3A-3C. In some embodiments, distribution fitting engine 132 is configured to fit a distribution to the histogram of the SPI performance of cohorts determined by cohort performance engine 130.

One example challenge of fitting a distribution to a histogram is that different dimensions may exhibit very different distributions. Some dimensions may have hundreds of unique values, while others have only a few. The shape of their distributions may vary. For example, many dimensions may display bell shapes that are skewed towards the right, while others may appear bi-modal.

For example, the graphs/histograms shown in FIGS. 3A-3C are shown for different content publishers with a specific filter. For example, FIG. 3B is a histogram of session data specific to a particular publisher, filtered on the protocol dimension. As shown in the example of FIGS. 3A-3C, although the same SPI metric is being evaluated, for different dimensions, the shape of the SPI data for the sessions belonging to different cohorts (different publishers under different filter dimensions) can be very different. Further, under different dimensions, there will be a different number of sessions that satisfy the dimension, which will further influence the shape of the session data when evaluating a performance metric.

In some embodiments, the platform is configured to determine or identify an appropriate distribution that can fit the metric value histograms for each given dimension. In this example, the empirical data is used to form a histogram, which shows the occurrence of observed SPI values determined from empirical session data. In these examples, a probability histogram is shown over the space of observed SPI values. SPI values can be continuous. In some embodiments, a distribution is applied to the histogram of performance metric values for cohorts to model the probability of possible SPI outcome values as a continuous probability distribution (e.g., continuous PDF), where the shape of the distribution can be adjusted.

With a continuous probability distribution fitted, the empirical performance metric values become samples from the distribution. While only a small number of SPI values were actually observed, the fitting of a continuous distribution provides the opportunity to model the probability of an SPI value being observed if there were many more samples taken.

The following are further embodiments of fitting a distribution for a cohort. One example fit is to assume a certain distribution to the data, such as a Gaussian distribution. Another example approach is to fit a distribution that fits each individual data point. There may be trade-offs between these approaches. For example, overfitting a distribution to the data values can result in capturing of noise.

The following are further embodiments of selecting a distribution to fit to a histogram of cohort performance. In some embodiments, a model is selected or determined that is flexible enough to fit different histogram shapes of the metric of interest (SPI in this example) on all dimensions, but is not so customized that it readily overfits individual dimensions. The model is also selected for ease of implementation and maintenance.

On one example end of the spectrum is a model such as a Gaussian distribution. The shape of the Gaussian distribution is not flexible (it is a fixed bell shape). On the other hand, the use of a Gaussian distribution will not result in overfitting, and is relatively efficient to implement—for example, the use of a Gaussian distribution involves calculating mean and standard deviation, where the outlier threshold can be determined accordingly. As shown in the examples of FIGS. 4A-4C, while the Gaussian is a general distribution, it does not fit well for certain dimensions. That is, the Gaussian results in an issue of underfitting.

On the other end of the spectrum is performing modeling that includes kernel density estimation. In kernel density estimation, a Gaussian kernel is applied to each value, and tail percentiles are determined accordingly. While such an approach can yield any shape of distribution, it can result in loss of insight of overall structure, in particular when the number of unique values on a dimension is relatively small. For example, the use of kernel density estimation to determine a distribution or a PDF (probability density function) may result in overfitting to the metric of interest (SPI in this example). Further, such an approach may be more computationally intensive.

In some embodiments, a beta distribution is utilized to facilitate outlier detection. For example, the beta distribution is bounded on both sides, and is appropriate for percentage and ratio variables. In the following examples, the use of a beta distribution to fit the histogram of SPI values determined for cohorts is utilized for illustrative purposes. The use of the beta distribution prevents overfitting (where overfitting would cause noise to be captured, resulting in inaccurate detection of outliers). The beta distribution, a type of scaled Gaussian, provides a good fit. Further, is computationally inexpensive, and can be computed efficiently at query time. That is, the beta distribution is one example type of distribution that can be used, as it does not result in overfitting or underfitting, and is efficient to compute at query time, allowing real-time traversing of a multi-dimensional space. The techniques described herein may be variously adapted to accommodate other types of distributions.

In some embodiments, the beta distribution is applicable across multiple dimensions. In other embodiments, different types of probability distributions are fitted for different types of dimensions. In some embodiments, an offline training process is used to determine an optimal type of distribution to fit to observed data.

Outlier Detection Based on a Distribution Fitted to a Cohort Performance Histogram With the fitted distribution, outliers can be determined by thresholding at desired tail percentiles, and bubbling up the client/dimension values that fall below the threshold tail percentile.

As shown in these examples, the system selects the best probability distribution that fits what is observed data in the histograms of the aggregate SPI metrics across dimension values/cohorts. The beta distribution is one example of a distribution that is relatively efficient to compute and provides an overall suitable fit to the SPI metric values of the cohort. Once the distribution is fit, tail percentiles are computed. The tail percentiles are then used to indicate outlier SPI metric values. That is, the system determines a distribution that best fits the observed data. Statistical parameters of the fitted distribution are then used to determine what dimension values are outliers. As another example, once a distribution is fit, a user can also be prompted to provide guidance on what the threshold for outlier determination should be. For example, the user can indicate a different percentile (e.g., $2^{nd}$ percentile) as a threshold for determining thresholds. As shown in the above examples, the determination of the threshold for outliers is configurable.

In some embodiments, the distribution fitting and outlier detection is determined at query time. The efficiency of the use of a distribution such as a beta distribution facilitates interactive exploration and query-time computation. In some embodiments, as described above, session-level metrics are stored in a database. At query time, session-level metrics are grouped into cohorts corresponding to dimension values of a dimension being evaluated. At a local machine (e.g., device 120), a distribution is fit, thresholds are determined, and outliers are detected. The fitting of a distribution such as a beta-distribution removes the need for large amounts of pre-compute, and allows for dynamic computation in a context in which the system does not know ahead of time which dimension and filter it will be triggered on. Further, the use of efficient query time distribution fitting and outlier detection facilitates interactive exploration in which the user and the system provide each other feedback and perform investigation of the space of dimensions in an iterative manner. In this way, a particular subspace can be quickly searched based on user feedback.

In other embodiments, the outlier detection based on distribution fitting is performed as a batch process. For example, the outlier detection is run daily, with outliers highlighted.

As described above, the models described above are run to identify which dimensions have outliers. One example output of the dimension scanning is a table that includes dimensions and values that are less than the smaller of the $5^{th}$ percentile threshold and 5 points below the mean, with volume more than 10,000, organized by content publisher (that subscribe to the services provided by the streaming analytics platform) and inversely sorted by volume. Other outlier thresholds and cutoffs may be utilized.

In some embodiments, the system is further configured to determine or identify which of the dimensions with outliers to surface. In some embodiments, all dimensions with any detected outliers (e.g., dimension values that are found to be outliers) are surfaced. As another example, the dimensions are ranked by the number of outliers identified within the dimensions. The dimensions with the highest numbers of outliers (dimension values) are surfaced. In some embodiments, a threshold is set for determining what number of dimensions are surfaced. In some embodiments, the conditions for determining what dimensions (that are identified as having the presence of outliers) are surfaced are configurable. For example, one user can configure the system to ignore (or otherwise not present) a dimension determined to have at least one outlier if the aggregate metric for the outlier dimension value is within a certain percentage of the "best" aggregate metric value (e.g., highest cohort-level SPI value) or of the mean aggregate metric value across the dimension values. In some embodiments, the volume of sessions that match to a dimension value (determined to be an outlier) is used to rank the dimensions for surfacing. For example, for a given outlier dimension value, the one with the largest corresponding volume of sessions is ranked highest. The ranking can also be computed as a function of multiple features, such as corresponding session volume, deviation from mean performance metric value, etc. Thresholding can also be performed to remove noise.

The use of outlier detection via distribution fitting provides a statistical approach that does not have any assumption on the data. For example, while examples and embodiments of dimension scanning and recommendation are provided in the context of diagnosing content streaming issues for illustrative purposes, the techniques described herein may be variously adapted to accommodate efficient investigation of a space of multidimensional data in other contexts. For example, the techniques described herein may be adapted for ingested IOT (internet of things) data from sensors in a manufacturing plant, where metrics and dimensions may be surfaced such as temperature, pressure, errors, fail faults, etc.

As described above, the dimension scanning and recommendation techniques described herein facilitate interactive analysis of sessions to determine issues in content streaming. For example, the user selects a value of a dimension, which is used as a filter for selecting a subset of streaming sessions (that share the dimension value selected for use as a filter). The automated insights system determines, for that filtered subset of streaming sessions, dimensions that have outliers (dimension values that have outlier performance metric values). At least some of the dimensions with detected outliers are recommended or otherwise surfaced to the user. The user can then select a recommended dimension, view the performance metrics for the various values of the dimension, and select a dimension value. The filter scope (for filtering a subset of streaming sessions) is then updated to include the new dimension value. The space of streaming sessions is now filtered on the original filter (that was used in the previous iteration), combined with the new dimension value (resulting in an updated filter scope). The automated insights system now further evaluates the subspace of streaming sessions that meet the new filter scope. In some embodiments, the user can again trigger the system to scan and provide recommendations of further dimensions to explore (and to further constrain the space of streaming sessions in further iterations). This iterative investigation can be repeated multiple times to arrive at a specific group or cohort of streaming sessions that is problematic, and determine the root cause (e.g., dimension or combination of dimensions) that is indicative of the issues being observed.

Embodiments of Adding Sample Weighting

There may be cases in which low performers (that should be surfaced) may not be outliers (e.g., with respect to tail percentiles) from a statistical perspective. Consider the example of FIG. 4B. There is only a small number of data samples, and suppose that because of this, the lowest performing cohort (422) is not below a $5^{th}$ percentile cutoff threshold (based on the fitted distribution). In this case, no outliers would be detected for the streaming protocol dimension, although it would be beneficial to surface such information to a user. While the percentile threshold could be increased to include low performers in these scenarios, this could also result in bubbling up or surfacing of too many other dimensions (because the bar for detecting an outlier has lowered).

Put another way, in some cases, the outlier(s) have a large enough impact on the distribution that they are no longer outliers. This may happen or occur when the number of unique values in the dimension is small, or the data is bi-modal and it would be desirable if the lower group were bubbled up.

For example, the number of cohorts under a dimension will vary by dimension. As one example, a stream type dimension may only have two dimension values: live and VOD (video on demand). That is, there will only be two cohorts or groups of sessions: a group of sessions that were live streaming, and a group of sessions that were video on demand streaming. This would result in bi-modal data. In the case of dimensions where there is a small number of cohorts, it can be challenging to determine whether any specific dimension value/cohort is an outlier.

In some embodiments, such issues are addressed by applying a sample weight while fitting the distribution. For example, a distribution is fit mostly on the (relatively) high performers by reducing the impact of low performers.

Figure 5A:
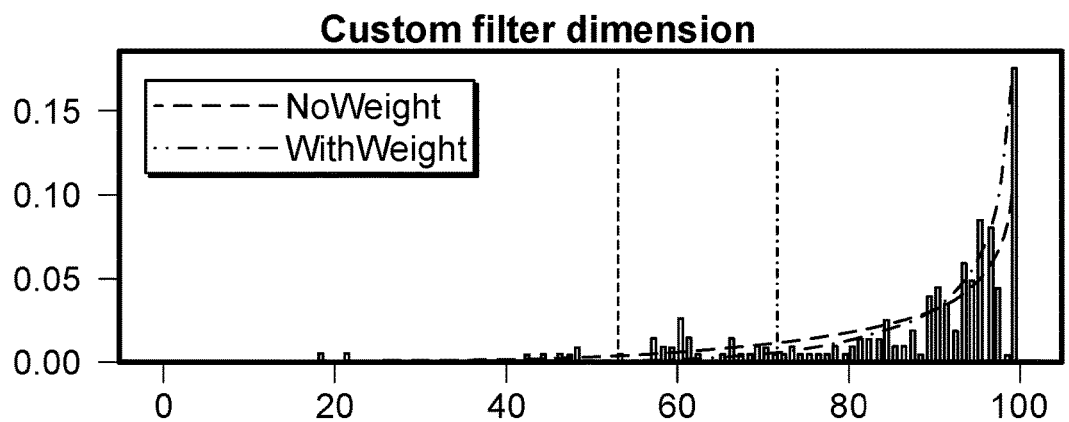
FIGS. 5A-5C illustrate embodiments of weighted distributions fit to histograms of cohort-level performance measures.
Figure 5B:
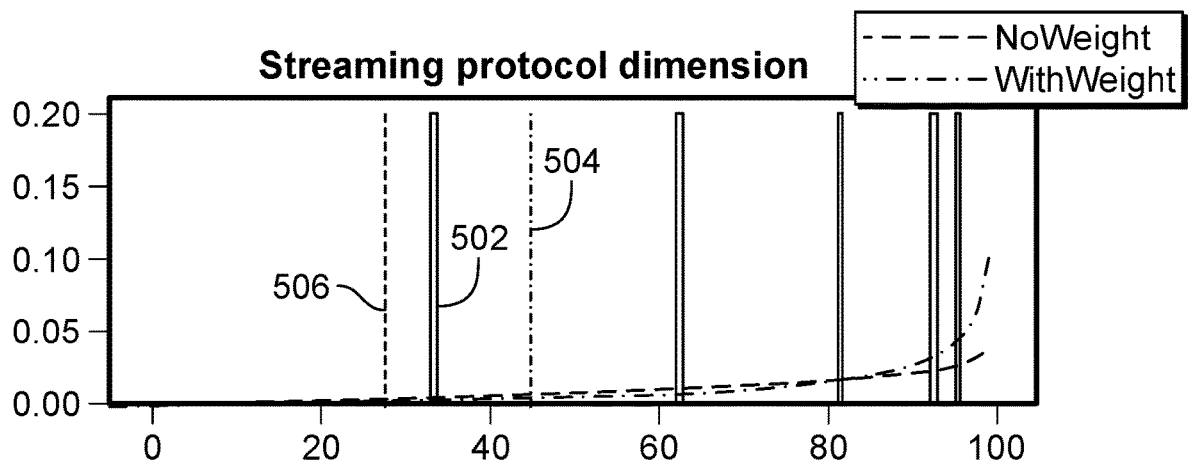
Figure 5C:
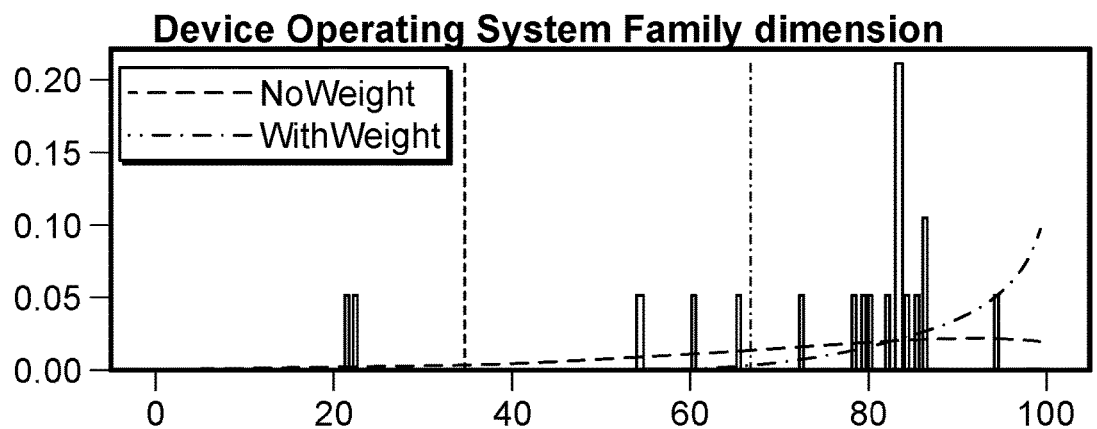
Figure 5D:
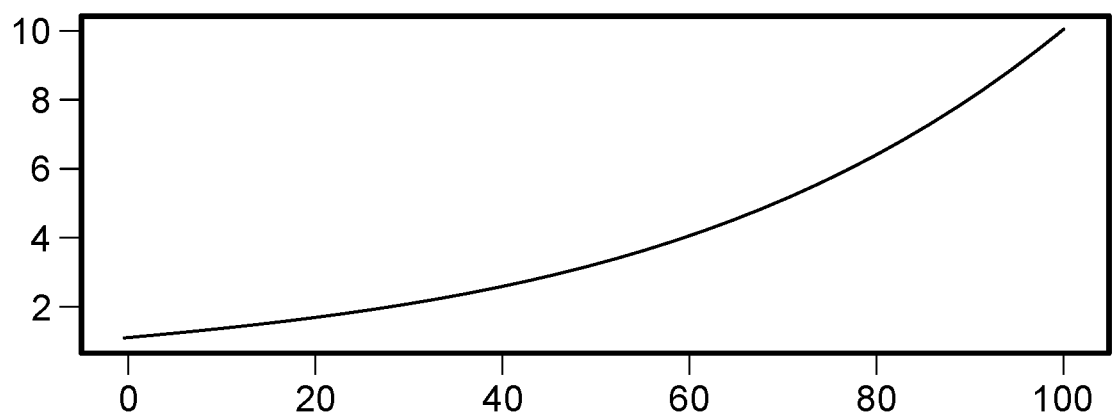
FIG. 5D illustrates an embodiment of a weighting function.

FIG. 5D illustrates an embodiment of a weighting function. In this example, the weight is an exponential function set to be 1 at 0, and 10 at 100 (where 10 is an example parameter that is adjustable). In this example, the exponential function ensures that the relative weight is determined by the distance of the samples (where a sample, for example, is the performance measure for a cohort in the histogram). The further away a low performer is from the higher group, the less weight it receives. Furthermore, if all values are shifted by a constant, the fitted distribution is also shifted, but not changed otherwise. Thus, in this example, a value 10 is as much an outlier to a group of 40 as a value 60 to a group of 90.

In some embodiments, weights are applied to each cohort within a dimension of interest/being analyzed. In some embodiments, this has the effect of uplifting the distribution PDF curve towards "good" values of a metric. "Bad" values of the metric are weighted lower. This results in a distribution shape that is closer to the actual distribution, even if there are only a few dimension values. In the example of FIG. 5B, this would result in the dimension value corresponding to the cohort 502 (in some embodiments, cohort 422) with an SPI value below the weighted cutoff threshold SPI value of 45 (as shown at 504) being labeled as an outlier dimension value. In this case, it has been determined that there is an outlier in the protocol dimension. Without weighting, no outlier would have been detected (because of the different threshold).

In some embodiments, with the weight applied, the fitted distribution generally shifts upwards toward higher numbers, exposing lower values. There may be tradeoffs between being more exposed in dimensions with small numbers of values, and bubbling up or surfacing more on the tail in other dimensions. Nevertheless, the weighting allows more to be exposed in the first scenarios while reducing the impact on the latter.

FIGS. 5A-5C illustrate embodiments of applying weighting when fitting a distribution. In this example, FIGS. 5A-5C correspond to FIGS. 4A-4C, and illustrate the distribution fitting and 5% tail percentile thresholding before and after the weighting is applied. For example, weighted and non-weighted versions of an applied or fitted distribution are shown in each of FIGS. 5A-5C. The dashed lines indicate thresholds or cutoffs (e.g., $5^{th}$ percentile) determined for weighted versus non-weighted distributions. Dimension values corresponding to groups of sessions that have SPI metric values lower than the cutoff are determined as outliers. That is, if there are any groups of sessions with SPI metric values below the cutoff, then there are outliers in the dimension. The dimension is then surfaced. If there are not groups of sessions with SPI metric values below the cutoff, then the dimension is not surfaced.

In some embodiments, the system determines the number of cohorts. If the number of different values for a dimension is below a threshold, then a distribution is not fitted. For example, if there are only two different cohorts, then it may not be possible to determine whether one group is an outlier or not.

For example, consider 5B. The protocol dimension is being analyzed. There are only five different protocols under the protocol dimension. That is, there are only five cohorts or groups of sessions. With respect to the SPI metric, the aggregate SPI metric for each of the five cohorts is determined. In this example, five different SPI metric values are determined. That is, there are five different SPI values for the five different cohorts. The distribution that is fit can be based on the number of times each empirically determined SPI value was computed, as well as the distance between observed SPI values.

In some embodiments, "good" values of the metric are weighted higher than others when fitting a distribution. By using the weighted distribution of FIG. 5B (with observed metric values weighted according to the weighting function of FIG. 5D), the updated threshold 504 (based on percentiles of the weighted distribution) will be able to capture that the lowest performing cohort is an outlier (whereas it would not have been flagged as an outlier based on the threshold 506 determined according to the non-weighted distribution). Without weighting, this dimension would have been determined to not have any outliers, even though one of the cohorts (502) had what would be considered "low" performance.

By performing the weighting, the distribution is skewed, facilitating outlier detection. A threshold is then determined based on the weighted distribution. The SPI value corresponding to a specific tail percentile is used as a threshold for determining whether a cohort (corresponding to a dimension value) is an outlier. For example, cohorts with SPI values lower than the threshold are designated as outliers.

Machine Learning-Based Next Dimension Recommendation

In the above, the system recommends the most insightful dimensions for further exploration and investigation based on outlier detection.

In an alternative embodiment, the system recommends dimensions based on the use of a machine learning model. For example, a machine learning model is trained based on how other users have analyzed or diagnosed a content streaming problem, where recommendations to new users are recommended by the model at inference time. Based on where a user is currently in a search process, the model outputs next dimensions to explore.

As one example, historical patterns of user searches (e.g., sequences of dimensions explored by expert users) are recorded and used to construct a training data set. The sequence or path of dimensions followed by the user (drill down paths) when diagnosing a certain type of problem is used to train an artificial intelligence/machine learning model. At inference time, when a user is diagnosing a certain type of problem, the trained model provides as output a recommendation or prediction of a next dimension to explore. For example, the model is trained to predict a best or optimal next step (e.g., dimension) to explore, based on the type of problem diagnosed, as well as the dimensions that have been explored by the current user so far.

As one example, the model is trained to perform classification based on similarity between sequences. This includes sequences of dimensions or sequences of dimensions combined with behavior on certain metrics for a specific problem (e.g., low SPI). Based on a similar kind of problem being diagnosed, the model predicts from the behavior or patterns of other prior users a sequence of actions or dimensions that could be applied to a specific user at inference time.

In this way, user domain knowledge is encoded in the machine learning model. The machine learning model is trained to learn patterns based on sequences of dimensions explored by other users.

Figure 6:
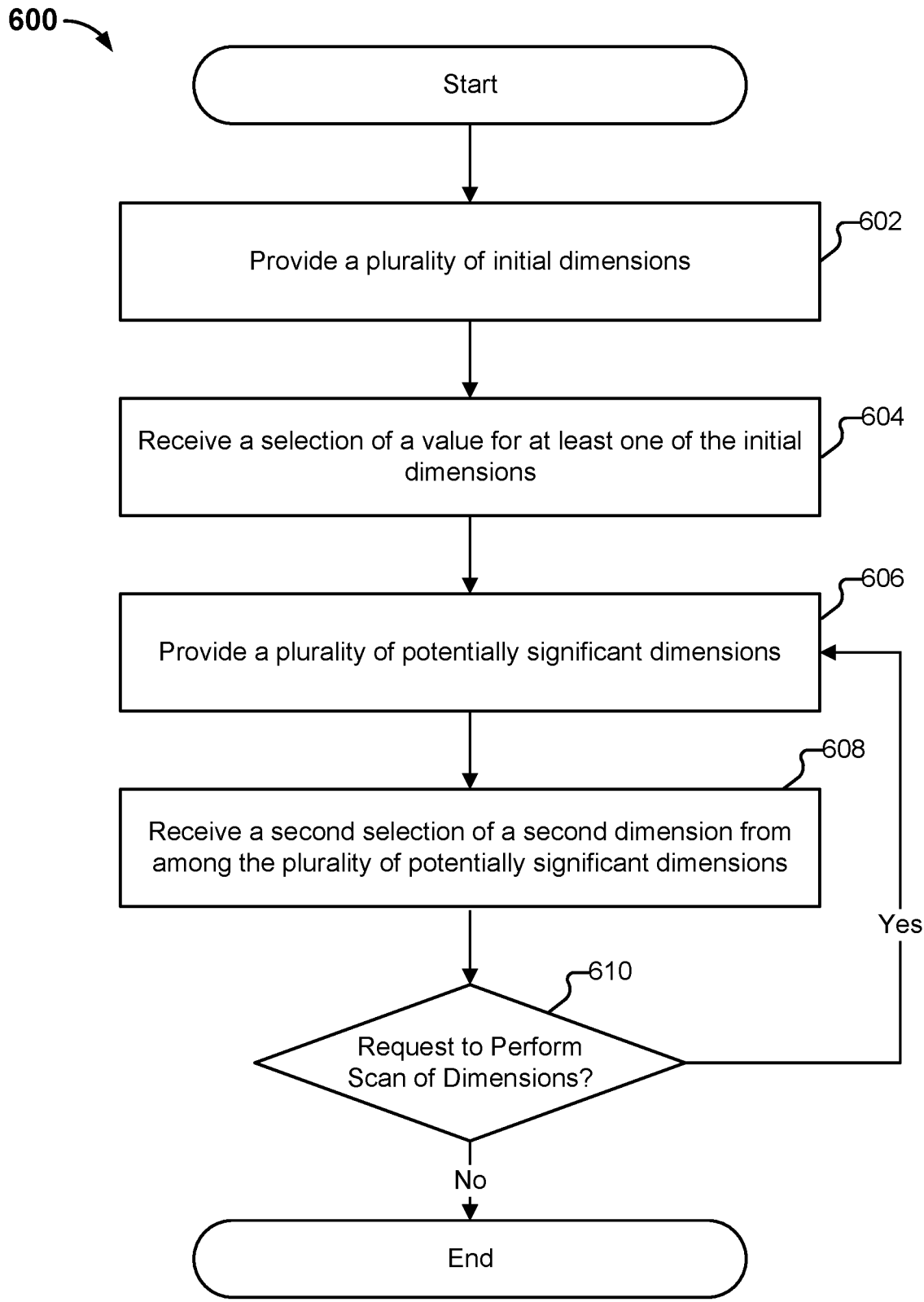
FIG. 6 is a flow diagram illustrating an embodiment of a process for automated scanning and surfacing of dimensions.

FIG. 6 is a flow diagram illustrating an embodiment of a process for automated scanning and surfacing of dimensions. In some embodiments, process 600 is executed by platform 102 of FIG. 1. At 602, a plurality of initial dimensions is provided. Each dimension represents a factor related to streaming performance. Examples of initial dimensions include those shown at 206, 208, and 210 of FIG. 2A. In some embodiments, the initial dimensions are also determined to be dimensions of potential significance, with the filter scope being all session traffic.

At 604, a first selection of a value for at least one of the initial dimensions is received. An example of a selection of a value under the device name dimension is shown in the example of FIG. 2A at 212.

At 606, a plurality of potentially significant dimensions is provided. In some embodiments, the plurality of potentially significant dimensions is determined based on an indication of presence of outliers in the potentially significant dimensions. This includes identifying a dimension that significantly affects performance. For example, in response to receiving a request from the user to auto scan dimensions, the system determines a filter scope, which is based, for example, on the selection of the dimension value at 604. A subset of data falling under the filter scope is determined. For example, a set of session-level performance measures corresponding to sessions matching the filter scope is obtained or accessed. In some embodiments, the session-level performance measures are generated from raw event level data that is streamed and collected/ingested from client devices in various applications, such as gaming applications, retail applications, etc. In some embodiments, the scanning of dimensions is performed as part of diagnosing issues in multi-dimensional streaming information.

Outlier detection is then performed for each dimension in a set of candidate dimensions being evaluated. Each dimension is associated with a set of dimension values. For example, for a given candidate dimension, performance of cohorts corresponding to different values of the dimension is determined. For example, the session-level performance measures corresponding to sessions matching the filter scope are grouped into cohorts, where each cohort corresponds to a dimension value of the candidate dimension being evaluated. As one example, the session-level performance measures grouped into a cohort correspond to sessions that share the dimension value in common. For each cohort, the corresponding group of session-level performance measures are aggregated into a cohort-level performance measure.

In some embodiments, the presence of cohorts with outlier performance is determined by fitting a distribution to the cohort performance data, identifying a threshold for detecting outliers based on the fitted distribution, and comparing empirical cohort performance to the identified threshold. As one example, a histogram is generated from the cohort-level performance measures. A probability distribution is fitted to the histogram of cohort-level performance measures. For example, a continuous distribution such as a beta distribution is fit to the histogram of cohort-level performance measures. An outlier detection threshold is selected based on the parameters of the fitted distribution. For example, a tail percentile (e.g., second tail percentile, fifth tail percentile, etc.) is selected as an outlier detection threshold. The cohort-level performance measures are then returned to. A cohort is identified or otherwise determined as an outlier by comparing the cohort's cohort-level performance measure against the threshold. If a cohort is identified as an outlier based on the comparison, then the dimension value corresponding to the cohort is determined as an outlier, and presence of an outlier has been detected for the candidate dimension.

For example, in the context of video streaming, the subset of all individual sessions (or session-level performance measures) that match to the filter scope is determined. A set of candidate dimensions is scanned. The following is another example of scanning a candidate dimension. The different values of the candidate dimension are determined. For each dimension value of the candidate dimension, a corresponding cohort of sessions is determined from the subset of individual sessions that matches to the filter scope. For each cohort, a cohort performance metric value is determined based on aggregation of the individual performance metric values for the sessions in the cohort. A probability distribution is fit across the cohort-level performance metric values. A statistical parameter of the probability distribution fitted to the cohort performance metric values is determined and used as an outlier threshold. The presence of any outlier cohorts is determined based on comparing of each cohort's performance metric value to the outlier threshold. Any dimensions that have cohorts identified as outliers are designated as potentially significant dimensions that affect streaming performance. As one example, a beta distribution is shaped and fit to the histogram of empirical cohort-level performance metric values. Tail percentiles of the fitted beta distribution are used as cutoffs or thresholds to perform outlier detection.

In other embodiments, machine learning models are used to suggest dimensions that have outliers. For example, a machine learning model is trained to suggest potentially significant dimensions based on historical diagnoses by users. For example, training data is generated based on search paths or sequences of dimensions explored by users when diagnosing issues. The suggested dimensions surfaced by the machine learning model based on user search patterns may be indicative of the presence of outliers in the set of dimensions (e.g., dimensions that are likely to have outliers).

At 608, a second selection of a second dimension from among the plurality of potentially significant dimensions is received. In some embodiments, information pertaining to the second dimension is provided. Such information includes performance information of cohorts corresponding to different values of the selected dimension. In some embodiments, the system receives a selection of a value for the dimension selected from the presented plurality of potentially significant dimensions, similarly to as in step 604. This updates the filter scope of sessions that are under consideration.

At 610, in response to a user request to perform a further scan of dimensions (e.g., to trigger another iteration of automated dimension scanning and recommendation), the process then returns to 606 for a next iteration of scanning of potentially significant dimensions. For example, the platform performs another scan of dimensions with the updated filter scope in response to a user request for further automated scanning and recommendations of dimensions. If a request for further scanning of dimensions is not received, then the process ends (or waits until a request for further scanning of dimensions is received).

As shown in the above, the system facilitates interactive search of the space of streaming sessions. For example, the system obtains user guidance, as the user may have understanding of the semantics of the data, such as the meaning behind dimensions. The interfaces provided by the system facilitate the inputting of users' semantic knowledge to the system.

In some embodiments, when querying the session performance, the interface begins with all traffic (filter scope is all sessions, where no values for any specific dimension on which to filter the sessions have been specified yet). All dimensions under all traffic are then scanned. The system surfaces which dimensions have outliers.

The user then, via the interface, applies their domain knowledge to select a specific dimension from the suggested dimensions. For example, the user selects the dimension that, based on their domain knowledge, is the most impactful or relevant. The interface then presents cohort information pertaining to cohorts in the selected dimension. The user can then select a specific dimension value corresponding to a cohort. This narrows down the search space to a specific cohort in a dimension. This allows the system to drill down at the next level of analysis into the traffic corresponding to that specific cohort. For example, suppose a dimension value of a dimension has been selected as the filter scope. The streaming sessions matching to the filter scope are obtained. The remaining dimensions are then scanned for outliers in the more constrained scope of streaming sessions. The following is an example of scanning dimensions. A set of streaming sessions that has been filtered according to a filter scope is obtained. A candidate dimension is obtained. The different unique values of the individual dimension are obtained. The set of filtered streaming sessions is partitioned into cohorts corresponding to the different unique dimension values. Outlier cohorts are determined. At this iteration or level of scanning, the outlier detection processing is repeated for the filtered set of streaming sessions for each individual dimension being evaluated. In this way, the system need not, at query time, evaluate multiple combinations of dimension values. That is, there is not crossing of dimensions or scanning of all possible combinations of dimensions, which would make it intractable from a computational perspective to evaluate streaming sessions. In order to make the searching tractable, the system facilitates incremental narrowing of the scope of sessions under evaluation. This results in searching of a space that is computationally possible to scan. Iteration is then performed using user knowledge and statistical models.

As shown in the above examples, user knowledge is captured at query time. To support real-time recommendation of dimensions, the distribution fitting is performed as a closed-form formulation to directly obtain desired values (e.g., as compared to performing a computation that might require hundreds of iterations to converge). Determining the beta distribution is an example of such a closed-form computation. For example, when fitting or determining a distribution shape to fit to the empirical data, a finite set of parameters (e.g., two shape parameters) are determined. Determining a distribution using such statistical analysis with a closed form computation allows real-time interaction at query time to be feasible.

In this way, during diagnosis of streaming performance issues, users are able to quickly and efficiently drill down into multiple dimensions (e.g., four, five, ten or more), which can expand with custom dimensions. The dimension scanning is scalable, where arbitrary levels or iterations of scanning can be facilitated. In this way, a user can efficiently determine which specific cohorts (with some specific combinations of dimension values) are of the most relevance to streaming issues being observed.

By allowing users to quickly explore cohorts at a granular level, useful actions to take can be determined that can change an outcome, such as improving user experience, addressing streaming issues, improving engagement, etc. In addition to guiding the search for a specific cohort of interest, the searching also facilitates determination of an action to take to address a streaming issue. With more data and metadata dimensions, cohorts can be determined at a granular level. Using the techniques described herein, even with a large number of sessions and a large number of metadata dimensions, exploration and identification of cohorts with specific characteristics are facilitated.

The data ingested by the system that is searched over (to identify cohorts of interest) can be collected from various sources. For example, in the video streaming context, metrics are ingested from client endpoints (e.g., software development kits (SDKs) integrated at client devices). Other sources of data sets include those pertaining to the video streaming infrastructure, such as encoders, origin servers, CDNs, etc. Such data sets include logs. For example, the system is scalable to allow ingestion of CDN logs, encoder logs, origin logs, ISP logs, etc. The ability to explore ingested data at arbitrary levels of granularity and dimensions allows for the diagnosis of root causes at highly granular levels in order to arrive at a specific action that will fix or address a problem.

For example, suppose there is a buffering issue. By correlating diagnosis with CDN logs, a user can identify that there was some latency or lag with a specific CDN server that was serving the content for that player, allowing for pinpointing of a specific server at a specific CDN edge that is the cause of a particular instance of buffering because the user is able to determine, with the assistance of the system, that every session connected to that edge (cohort) is having issues at this time. By isolating the issue or cause to a specific CDN edge server, the user can then take specific actions, such as replacing the server, etc. By having additional metadata for additional points along the content streaming, further granularity for the root cause can be determined.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for evaluating multi-dimensional information, comprising:
one or more processors that:
ingest one or more streams of raw, multi-dimensional event data collected via sensors installed on a plurality of remote client devices;
pre-compute session level performance measures at least in part by summarizing the ingested raw, multi-dimensional event data on a per-session basis; and
store the pre-computed session-level performance measures to a data store;
an interface that:
provides a plurality of initial dimensions, wherein each dimension represents a factor related to performance;
receives, from a user, a first selection of a value for a first dimension in the plurality of initial dimensions;
provides a plurality of potentially significant dimensions from among a set of dimensions, wherein the set of dimensions comprises a search space determined based at least in part on the first selection of the value for the first dimension; and
receives a second selection of a second dimension from among the plurality of potentially significant dimensions; and
wherein the one or more processors further:
determine the plurality of potentially significant dimensions based on an indication of presence of outliers in the plurality of potentially significant dimensions, wherein a dimension that significantly affects performance is identified, and wherein the dimension that significantly affects performance is identified at least in part by scanning, at query time, the search space at least in part by:
determining a set of performance measures at least in part by accessing the data store of precomputed session level performance measures based at least in part on the first selection of the value by the user;
grouping the set of performance measures into cohorts of performance measures, wherein each cohort corresponds to a dimension value of the dimension, and wherein the dimension comprises a plurality of dimension values;
generating, for each cohort, a corresponding cohort-level performance measure at least in part by dynamically performing, at query time, an aggregation across pre-computed session-level performance measures belonging to a given cohort;

fitting, at query time, a beta distribution to the cohort-level performance measures; and detecting a presence of an outlier in the dimension based at least in part on a parameter associated with the beta distribution fitted, at query time, to the cohort-level performance measures, wherein the detected presence of the outlier in the dimension is indicative of anomalous performance behavior; and based at least in part on the scanning, at query time, of the search space, dynamically update the interface, including:

surfacing, as a selectable option, the identified dimension that significantly affects performance to the user as a recommended next dimension to explore, wherein the second selection is received in response to the user clicking on the identified dimension surfaced in the interface as the selectable option, the second dimension comprising the identified dimension; and responsive to the user clicking on the identified dimension surfaced in the interface, updating a panel in the interface, including visually indicating ratings of performance of sessions grouped according to different values of the identified dimension clicked on by the user, wherein the ratings of performance are determined according to a multi-level scale.

2. The system of claim 1, wherein determining the set of performance measures comprises determining a filtered subset of performance measures based at least in part on the first selection of the value.

3. The system of claim 1, wherein fitting the beta distribution to the cohort-level performance measures comprises determining a histogram of the cohort-level performance measures, and wherein the beta distribution is fitted to the histogram of the cohort-level performance measures.

4. The system of claim 1, wherein detecting the presence of the outlier in the dimension comprises:

determining an outlier threshold based at least in part on the parameter of the beta distribution fitted to the cohort-level performance measures; and detecting that a cohort corresponding to a dimension value is an outlier based on a comparison of the corresponding cohort-level performance measure of the cohort to the outlier threshold.

5. The system of claim 4, wherein the outlier threshold is based on a tail percentile of the fitted beta distribution.

6. A method, comprising:

ingesting one or more streams of raw, multi-dimensional event data collected via sensors installed on a plurality of remote client devices;

pre-computing session-level performance measures at least in part by summarizing the ingested raw, multi-dimensional event data on a per-session basis;

storing the pre-computed session-level performance measures to a data store;

providing, via an interface, a plurality of initial dimensions, wherein each dimension represents a factor related to performance;

receiving, from a user via the interface, a first selection of a value of a first dimension in the plurality of initial dimensions;

providing, via the interface, a plurality of potentially significant dimensions from among a set of dimensions, wherein the set of dimensions comprises a search space determined based at least in part on the first selection of the value for the first dimension;

receiving, via the interface, a second selection of a second dimension from among the plurality of potentially significant dimensions;

determining, by one or more processors, the plurality of potentially significant dimensions based on an indication of presence of outliers in the plurality of potentially significant dimensions, wherein a dimension that significantly affects performance is identified, and wherein the dimension that significantly affects performance is identified at least in part by scanning, at query time, the search space at least in part by:

determining a set of performance measures at least in part by accessing the data store of pre-computed session-level performance measures based at least in part on the first selection of the value by the user;

grouping the set of performance measures into cohorts of performance measures, wherein each cohort corresponds to a dimension value of the dimension, and wherein the dimension comprises a plurality of dimension values;

generating, for each cohort, a corresponding cohort-level performance measure at least in part by dynamically performing, at query time, an aggregation across pre-computed session-level performance measures belonging to a given cohort;

fitting, at query time, a beta distribution to the cohort-level performance measures; and detecting a presence of an outlier in the dimension based at least in part on a parameter associated with the beta distribution fitted, at query time, to the cohort-level performance measures, wherein the detected presence of the outlier in the dimension is indicative of anomalous performance behavior; and based at least in part on the scanning, at query time, of the search space, dynamically updating the interface, including:

surfacing, as a selectable option, the identified dimension that significantly affects performance to the user as a recommended next dimension to explore, wherein the second selection is received in response to the user clicking on the identified dimension surfaced in the interface as the selectable option, the second dimension comprising the identified dimension; and responsive to the user clicking on the identified dimension surfaced in the interface, updating a panel in the interface, including visually indicating ratings of performance of sessions grouped according to different values of the identified dimension clicked on by the user, wherein the ratings of performance are determined according to a multi-level scale.

7. The method of claim 6, wherein determining the set of performance measures comprises determining a filtered subset of performance measures based at least in part on the first selection of the value.

8. The method of claim 6, wherein fitting the beta distribution to the cohort-level performance measures comprises determining a histogram of the cohort-level performance measures, and wherein the beta distribution is fitted to the histogram of the cohort-level performance measures.

9. The method of claim 6, wherein detecting the presence of the outlier in the dimension comprises:

determining an outlier threshold based at least in part on the parameter of the beta distribution fitted to the cohort-level performance measures; and detecting that a cohort corresponding to a dimension value is an outlier based on a comparison of the corresponding cohort-level performance measure of the cohort to the outlier threshold.

10. The method of claim 9, wherein the outlier threshold is based on a tail percentile of the fitted beta distribution.

* * * * *

UNITED STATES PATENT AND TRADEMARK OFFICE
CERTIFICATE OF CORRECTION

PATENT NO. : 12,346,411 B1  
APPLICATION NO. : 18/642480  
DATED : July 1, 2025  
INVENTOR(S) : Ganjam et al.

Page 1 of 1

It is certified that error appears in the above-identified patent and that said Letters Patent is hereby corrected as shown below:

In the Specification

In Column 11, Line(s) 41, after "request", delete "for".

In Column 16, Line(s) 37, delete "session level" and insert --session-level--, therefor.

In Column 16, Line(s) 62 & 63, delete "session level" and insert --session-level--, therefor.

In Column 17, Line(s) 6, delete "session level" and insert --session-level--, therefor.

In Column 17, Line(s) 12, delete "session level" and insert --session-level--, therefor.

In Column 17, Line(s) 55, after "samples", delete ")" and insert --)--, therefor.

In Column 19, Line(s) 36, after "capturing", delete "of".

In Column 20, Line(s) 10, after "Further,", insert --it--.

In Column 22, Line(s) 22, delete "is" and insert --are--, therefor.

In Column 22, Line(s) 46, delete "is" and insert --are--, therefor.

In the Claims

In Column 28, Line(s) 28, Claim 1, delete "session level" and insert --session-level--, therefor.

In Column 28, Line(s) 57 & 58, Claim 1, delete "precomputed session level" and insert --pre-computed session-level--, therefor.

Signed and Sealed this  
Twenty-fifth Day of November, 2025

John A. Squires  
*Director of the United States Patent and Trademark Office*